United States Patent
Ki et al.

(10) Patent No.: US 11,360,245 B2
(45) Date of Patent: Jun. 14, 2022

(54) LENS FOR WIDE DIFFUSION LIGHT

(71) Applicant: HL OPTICS CO., LTD, Hwaseong-si (KR)

(72) Inventors: Ho Kyung Ki, Cheonan-si (KR); Kang Hyun Lee, Pyeongtaek-si (KR)

(73) Assignee: HL OPTICS CO., LTD., Hwaseong-si (KR)

( * ) Notice: Subject to any disclaimer, the term of this patent is extended or adjusted under 35 U.S.C. 154(b) by 314 days.

(21) Appl. No.: 16/680,821

(22) Filed: Nov. 12, 2019

(65) Prior Publication Data

US 2020/0150320 A1    May 14, 2020

(30) Foreign Application Priority Data

Nov. 12, 2018    (KR) .................. 10-2018-0138515

(51) Int. Cl.
G02B 5/02 (2006.01)
G02B 3/08 (2006.01)

(52) U.S. Cl.
CPC ............. G02B 5/0278 (2013.01); G02B 3/08 (2013.01)

(58) Field of Classification Search
CPC ................................ G02B 5/0278; G02B 3/08
USPC ....................................................... 359/599
See application file for complete search history.

(56) References Cited

U.S. PATENT DOCUMENTS

2007/0258247 A1    11/2007  Park et al.
2011/0210368 A1     9/2011  Jeong et al.
2013/0320843 A1*   12/2013  Lee .................. H05B 33/04
                                                         313/512
2014/0328069 A1    11/2014  Jeong et al.
2015/0378214 A1    12/2015  Tran et al.

FOREIGN PATENT DOCUMENTS

| EP | 2963474 A1 | 1/2016 |
|----|------------|--------|
| KR | 10-1826325 B1 | 2/2018 |
| KR | 10-2018-0118512 A | 10/2018 |
| WO | 2006/122153 A1 | 11/2006 |
| WO | 2014/184422 A1 | 11/2014 |

OTHER PUBLICATIONS

Partial European Search Report of corresponding European Patent Application No. 19207394.8—10 pages (dated Apr. 3, 2020).
Extended European Search Report of corresponding European Patent Application No. 19207394.8—8 pages (dated Jul. 16, 2020).

* cited by examiner

*Primary Examiner* — Collin X Beatty

(74) *Attorney, Agent, or Firm* — Knobbe Martens Olson & Bear LLP

(57) ABSTRACT

Disclosed herein is a light diffusion lens. The light diffusion lens according to one embodiment of the present disclosure includes a bottom surface, an incidence surface concavely formed inward the bottom surface from one area (an incidence hole) thereof, and an exit surface from which light incident through the incidence surface is emitted, wherein at least two protrusions are formed on the incidence surface symmetrically in relation to an optical axis or at least two second dimples are formed on the exit surface symmetrically in relation to the optical axis.

3 Claims, 27 Drawing Sheets

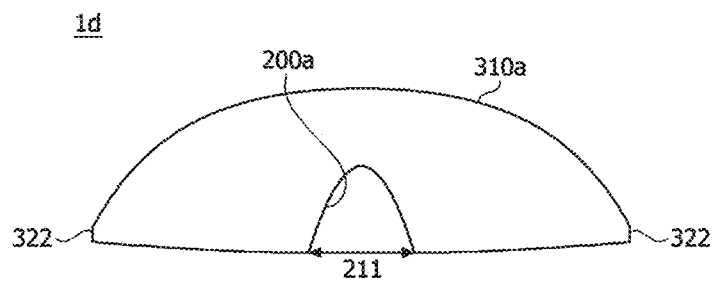
FIG. 44
FIG. 45
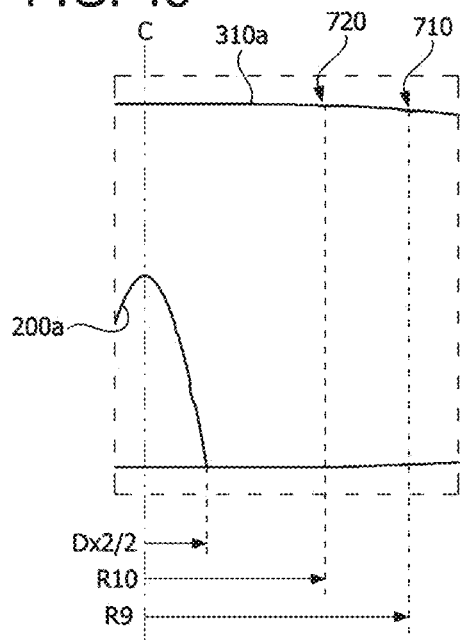
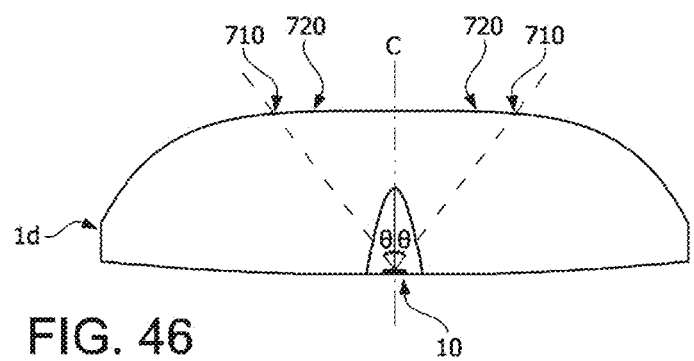
FIG. 46

(a)   (b)

LENS FOR WIDE DIFFUSION LIGHT

CROSS-REFERENCE TO RELATED APPLICATION

Pursuant to 35 U.S.C. § 119 (a), this application claims the benefit of earlier filing dates and rights of priorities to Korean Patent Applications No. 10-2018-0138515, filed on Nov. 12, 2018, the contents of which are hereby incorporated by reference in their entirety.

BACKGROUND

Field

The present disclosure relates to a light diffusion lens.

Discussion of Related Art

Recently, the demands for flat panel display devices having more improved performance while being smaller in size and lighter in weight are explosively increasing around the rapidly developing semiconductor technology.

Among these flat panel display devices, since liquid crystal display (LCD) devices, which are recently getting attention, have advantages such as miniaturization, weight reduction, and low power consumption, and the like, the LCD devices are gradually getting attention as alternatives to overcome disadvantages of the conventional cathode ray tube (CRT). Currently, the LCD devices are installed and used in many information processing devices which need a display device.

Since LCD panels in the LCD devices are light receiving elements which do not emit light by itself, the LCD panels have backlight units for providing light to the LCD panels therebelow. Here, the backlight unit may include a lamp, a light guiding panel, a reflective sheet, an optical sheet, and the like.

The lamp employs a cold cathode fluorescent lamp generating relatively low heat, generating white light near natural light, and having a long service life, or a light emitting diode (LED) type lamp having excellent color reproducibility and low power consumption. The cold cathode fluorescent lamp was conventionally used. However, since the LED type lamp has advantages of excellent color reproducibility and low power consumption, products of LED type lamps have begun to be employed.

The disclosure of this section is to provide background information relating to the invention. Applicant does not admit that any information contained in this section constitutes prior art.

SUMMARY

The present disclosure is directed to a light diffusion lens which minimizes a dark portion formed in light diffused through a lens using a dimple formed on an incidence surface or an exit surface.

The present disclosure is also directed to a light diffusion lens which is capable of securing light diffusivity and light uniformity by changing an optical path of a part of light having directivity in a specific direction using a dimple formed on an incidence surface or an exit surface.

The present disclosure is also directed to a light diffusion lens which is capable of preventing or minimizing a dark portion, which may be formed in diffused light, by proposing a shape or a position of a dimple formed on an incidence surface, a shape or a position of a dimple formed on an exit surface, and a relationship between the dimple formed on the incidence surface and the dimple formed on the exit surface in terms of design.

In one general aspect, there may be provided a light diffusion lens comprising: a bottom surface; an incidence surface concavely formed inward the bottom surface from one area (an incidence hole) thereof; and an exit surface from which light incident through the incidence surface is emitted, wherein at least two protrusions are formed on the incidence surface symmetrically in relation to an optical axis.

In some exemplary embodiment of the present invention, each of the at least two protrusions may be disposed within a predetermined divergence angle based on the optical axis, and the divergence angle is less than or equal to 50 degrees.

In some embodiment of the present invention, each of the at least two protrusions may be convexly formed from the incidence surface toward the optical axis.

In some embodiment of the present invention, an edge at which the at least two protrusions and the incidence surface meet may have a circular shape.

In some embodiment of the present invention, the sum of areas of the at least two protrusions may be less than or equal to 30% of an entire area of the incidence surface.

In some embodiment of the present invention, any point on each of the at least two protrusions may correspond to the center of the height of the incidence surface.

In some embodiment of the present invention, at least two dimples may be formed on the exit surface symmetrically in relation to the optical axis.

In some embodiment of the present invention, each of the at least two dimples may be disposed within a predetermined divergence angle based on the optical axis, and an angle between the optical axis and a center of each of the at least two dimples may range from about 36 degrees to about 40 degrees.

In some embodiment of the present invention, each of the at least two dimples may have an elliptical shape.

In other general aspect of the present invention, there may be provided a light diffusion lens comprising: a bottom surface having an elliptical shape; an incidence surface concavely formed inward the bottom surface from one area (an incidence hole) thereof; and an exit surface from which light incident through the incidence surface is emitted, wherein at least two dimples are disposed on the exit surface symmetrically in relation to an optical axis.

In some embodiment of the present invention, each of the at least two dimples may be disposed within a predetermined divergence angle based on the optical axis, and an angle between the optical axis and a center of each of the at least two dimples may range from about 36 degrees to about 40 degrees.

In some embodiment of the present invention, each of the at least two dimples may have an elliptical shape.

In another general aspect of the present invention, there may be provided a light diffusion lens comprising: a bottom surface having an elliptical shape; an incidence surface concavely formed inward the bottom surface from one area (an incidence hole) thereof; and an exit surface from which light incident through the incidence surface is emitted, wherein a first dimple of an elliptical shape is formed on the exit surface at a position of a predetermined first radius from an optical axis, at least two second dimples having an elliptical shape are formed on the exit surface at a position of a second radius that is smaller than the first radius, and a third dimple having an elliptical shape is formed on the exit surface at a position of a third radius that is smaller than the second radius.

In some embodiment of the present invention, a long axis of the bottom surface may be disposed to correspond to short axes of the first and third dimples.

In some embodiment of the present invention, length of long axis of each of the at least two second dimples may be smaller than that of long axis of the first dimple and may be greater than that of long axis of the third dimple.

BRIEF DESCRIPTION OF THE DRAWINGS

The above and other aspects, features and advantages of the present disclosure will become more apparent to those of ordinary skill in the art by describing embodiments thereof in detail with reference to the accompanying drawings, in which:

FIG. 44 is a cross-sectional view in a short axis direction based on the exit surface of the light diffusion lens according to the fifth embodiment;

FIG. 45 is an enlarged view illustrating area F of FIG. 43;

FIG. 46 is a diagram illustrating an arrangement relationship between a light source and the light diffusion lens according to the fifth embodiment;

DETAILED DESCRIPTION OF EMBODIMENTS

The present disclosure may be applied with various changes, and may be included with various embodiments, and particular embodiments will be exemplified by drawings and explained in the Detailed Description. However, the present disclosure will not be limited to the particular embodiments, and the described aspect is intended to embrace all such alterations, modifications, and variations that fall within the scope and novel idea of the present disclosure.

Accordingly, in some embodiments, well-known processes, well-known device structures, and well-known techniques are not illustrated in detail to avoid unclear interpretation of the present disclosure.

Hereinafter, embodiments of the present disclosure will be described in detail with reference to the accompanying drawings.

Light emitted from an LED may have strong directivity and tends to concentrate in a front direction of the LED. Therefore, in some instances light is not uniformly distributed throughout the LCD panel and a front portion of the LED becomes brighter and a portion away from the front portion thereof becomes darker. Thus, the demands for technology to effectively and uniformly diffuse the light of LED are increasing.

In particular, in real life, a size of the LCD panel is increased due to high brightness and high efficiency of the LED, and the LED emits light through four or five surface-emission instead of one surface-emission so that the demands for technology to effectively and uniformly diffuse the light of the LED are increasing.

Therefore, the demands are also increasing for lens technology for designing an incidence surface on which light is incident and an exit surface from which the light is emitted so as to allow the LED to implement surface emission and, on the basis of the design, minimizing a dark portion which is locally generated due to a lens such that uniformity of the light can be improved.

First Embodiment

Figure 1:
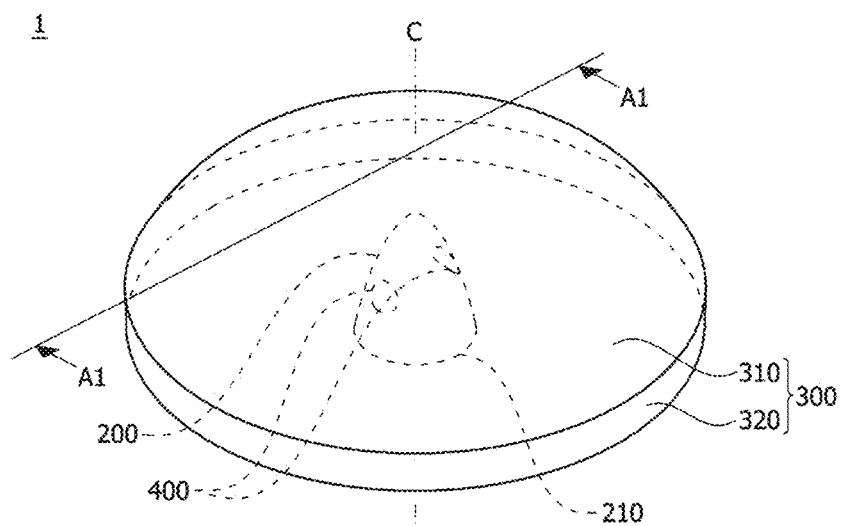
FIG. 1 is a perspective view illustrating a light diffusion lens according to a first embodiment.
Figure 2:
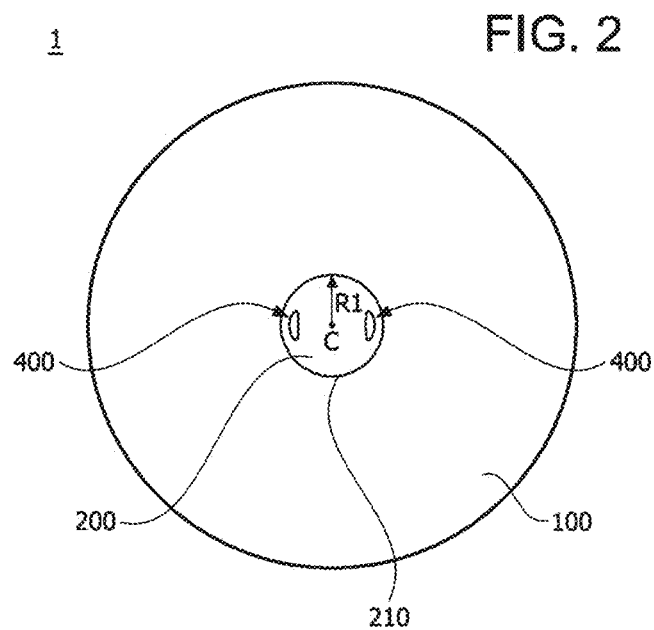
FIG. 2 is a bottom view illustrating the light diffusion lens according to the first embodiment.
Figure 3:
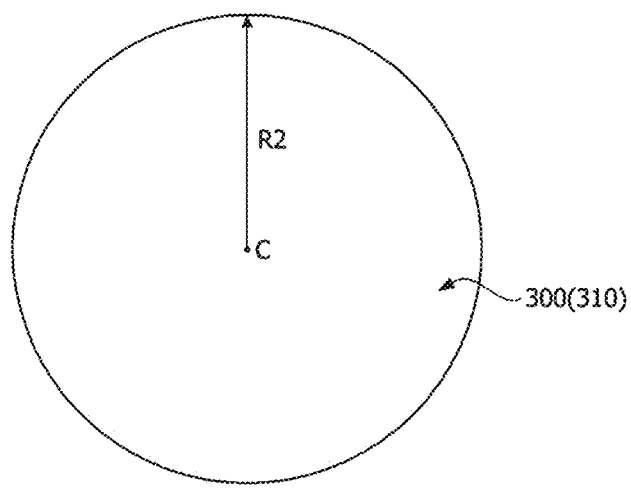
FIG. 3 is a plan view illustrating the light diffusion lens according to the first embodiment.
Figure 4:
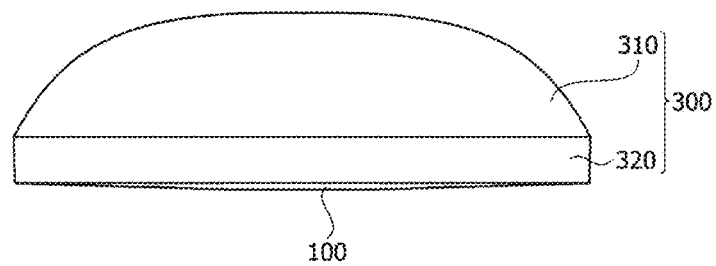
FIG. 4 is a side view illustrating the light diffusion lens according to the first embodiment.
Figure 5:
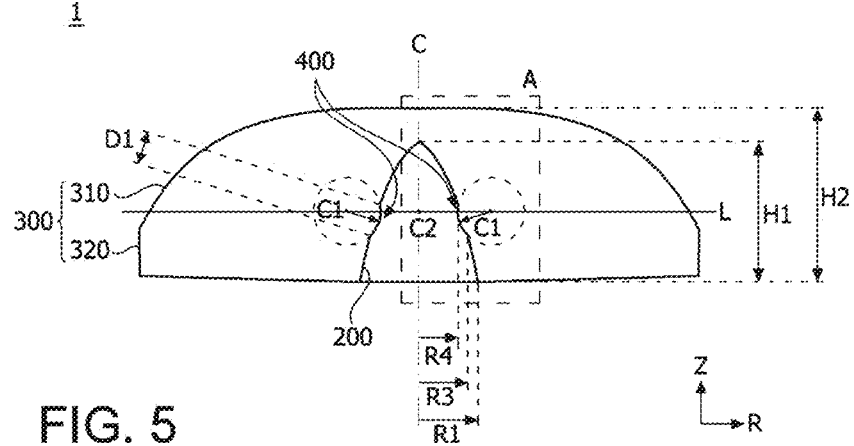
FIG. 5 is a cross-sectional view illustrating the light diffusion lens according to the first embodiment.
Figure 6:
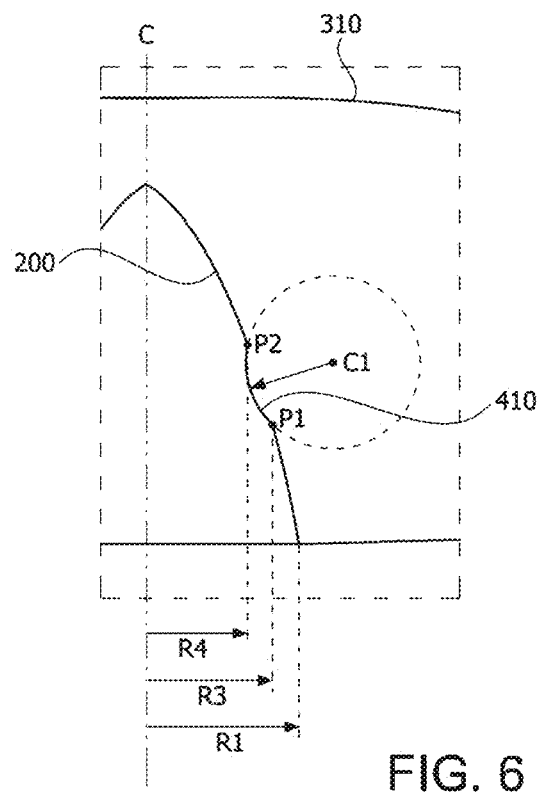
FIG. 6 is an enlarged view illustrating area A of FIG. 5.
Figure 7:
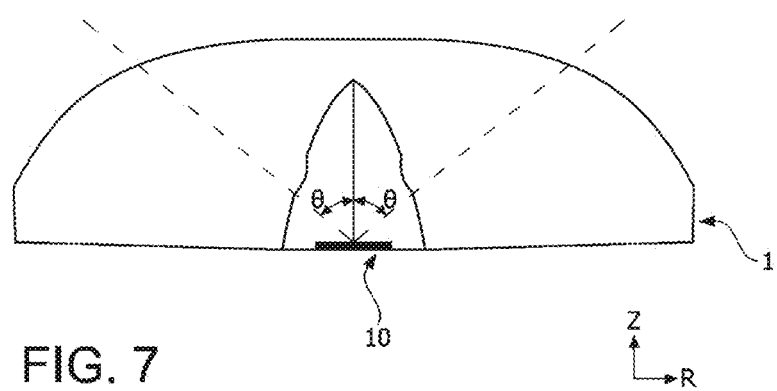
FIG. 7 is a diagram illustrating an arrangement relationship between a light source and the light diffusion lens according to the first embodiment.

FIG. 1 is a perspective view illustrating a light diffusion lens according to a first embodiment, FIG. 2 is a bottom view illustrating the light diffusion lens according to the first embodiment, FIG. 3 is a plan view illustrating the light diffusion lens according to the first embodiment, FIG. 4 is a side view illustrating the light diffusion lens according to the first embodiment, FIG. 5 is a cross-sectional view illustrating the light diffusion lens according to the first embodiment, FIG. 6 is an enlarged view illustrating area A of FIG. 5, and FIG. 7 is a diagram illustrating an arrangement relationship between a light source and the light diffusion lens according to the first embodiment. Here, FIG. 5 is a cross-sectional view taken along line A1-A1 of FIG. 1. In FIGS. 4 and 5, an R direction indicates a radial direction, and a Z direction indicates an axial direction or an optical axis direction.

Meanwhile, an optical axis C may be a center of light emitted from a light source 10 and may coincide with a center of a light diffusion lens 1.

The light diffusion lens 1 according to the first embodiment may be used in a liquid crystal display device. In this case, the liquid crystal display device may include a substrate and a plurality of light sources 10 which are mounted on the substrate. The light diffusion lens 1 may be disposed to cover the light source 10 to diffuse the light emitted from the light source 10. In this case, the light diffusion lens 1 may diffuse the light using a protrusion or bulge formed on an aspherical-shaped incidence surface 200, thereby improving light uniformity.

Referring to FIGS. 1 to 7, the light diffusion lens 1 according to the first embodiment may include a bottom surface 100, the incidence surface 200 on which light is incident, an exit surface 300 from which the light incident through the incidence surface 200 is emitted, and first protrusions or bulges 400 convexly formed on the incidence surface 200. Here, the exit surface 300 may include a top surface 310 and a side surface 320. In this case, the top surface 310 may be convexly formed toward an upper side. Here, the "upper side" and a "lower side" are relative expressions. Unless otherwise defined below, a direction from the bottom surface 100 to the top surface 310 is determined as the upper side (upward side), and, conversely, a direction from the top surface 310 to the bottom surface 100 is determined as the lower side (downward side).

Therefore, the light diffusion lens 1 may diffuse the light emitted from the light source 10 using the aspherical-shaped incidence surface 200, the exit surface 300, and the first protrusions 400 formed on the incidence surface 200.

In embodiments, in the light diffusion lens 1, since an optical path of the light emitted from the light source 10 is changed due to shapes of the incidence surface 200 and the exit surface 300 and the first protrusions 400, the incidence surface 200 which is formed in the aspherical shape, the shape of the exit surface 300, and arrangements, shapes, and sizes of the first protrusions 400 act as largest factors of light distribution according to the change of the optical path of the light.

The light diffusion lens 1 may be formed using a material of polycarbonate or polymethmethylacrylate. Here, a refractive index of polycarbonate is 1.58, and a refractive index of polymethmethylacrylate is 1.49.

Referring to FIG. 3, the bottom surface 100 may be formed in a circular shape in which an incidence hole 210 is disposed at a center thereof.

Further, the bottom surface 100 may be formed in a downwardly convex shape or a flat surface shape.

The downwardly convex-shaped bottom surface 100 may be a curved surface having a curvature that is greater than that of a central portion of the top surface 310.

An example of the bottom surface 100 includes a bottom surface formed of a curved surface having a downwardly convex shape, but the present disclosure is not necessarily limited thereto. For example, in the bottom surface 100, a flat surface may be formed from an edge to a predetermined length in a center direction, and a lower convex surface may be formed from a position at which the flat surface ends to a center side. In embodiments, the bottom surface 100 may have a shape of which curvature is zero from the edge to a predetermined length in the center direction and increases and then decreases again to the center of the bottom surface 100 from the predetermined length.

When compared with a bottom surface comprised of only the flat surface, the bottom surface 100 having the lower convex surface may totally reflect more light, which is emitted to the lower side, toward the upper side among lights emitted from the light source 10.

Here, in order to preferentially totally reflect the light due to the lower convex surface, the flat surface may be disposed outside the lower convex surface.

Further, the bottom surface 100 of a flat surface shape may be formed to be inclined from an end portion of a lower side of the side surface 320 toward the optical axis C. Referring to FIG. 4, the bottom surface 100 of a flat surface shape may be a flat surface which is formed to be inclined with respect to an imaginary horizontal surface at a predetermined angle based on the end portion of the lower side of the side surface 320. Accordingly, the bottom surface 100 may totally reflect more light, which is emitted to the lower side, toward the upper side among lights emitted from the light source 10.

The incidence surface 200 is a surface portion through which the light emitted from the light source 10 located in the incidence hole 210 is incident into the light diffusion lens 1.

As shown in FIGS. 1 and 5, the aspherical-shaped incidence surface 200 may be formed to be concave inward the bottom surface 100 from the center thereof. Accordingly, the incidence hole 210 may be formed in the center of the bottom surface 100.

A vertical cross section of the incidence surface 200 may be formed in a semi-elliptical shape, a semi-rugby ball shape, or a parabolic shape. Accordingly, the incidence surface 200 may be formed of an aspherical surface. In this case, the incidence surface 200 may be formed to have a predetermined height H1 from the bottom surface 100 based on the optical axis direction.

Referring to FIGS. 1,3, and 5, a horizontal cross section of the incidence surface 200 may have a circular shape which is formed to have a predetermined radius. In this case, since the vertical cross section of the incidence surface 200 is formed in a semi-elliptical shape, a semi-rugby ball shape, or a parabolic shape, a radius of the horizontal cross section of the incidence surface 200 may be decreased toward the upper side. Accordingly, the incidence surface 200 may have a maximum radius R1.

The incidence hole 210 may be formed in a circular shape which is formed with a predetermined radius. In this case, since the incidence hole 210 is disposed below the incidence surface 200, the incidence surface 200 may be formed with the maximum radius R1 in the incidence hole 210. Here, the maximum radius R1 of the incidence surface 200 may be called a first radius.

A center of the incidence hole 210 may be disposed on the optical axis C, and the light source 10 may be disposed at the center of the incidence hole 210. Accordingly, an air layer may be disposed between the light source 10 and the incidence surface 200. Thus, light emitted from the light source 10 to the air layer may be refracted at the incidence surface 200 of the light diffusion lens 1 having a different refractive index.

The exit surface 300 may be a surface of the light diffusion lens 1 from which the light incident through the incidence surface 200 is emitted and may be formed to be rotationally symmetrical based on the optical axis C. Accordingly, as shown in FIG. 3, when the exit surface 300 is viewed from the optical axis direction, the exit surface 300 may be formed in a circular shape so as to have a predetermined radius R2. Here, the radius R2 of the exit surface 300 may be called a second radius.

A height H2 of the exit surface 300 may be smaller than the radius R2 of the exit surface 300.

Referring to FIG. 4, the exit surface 300 may include the convex-shaped top surface 310 and the side surface 320 disposed between the top surface 310 and the bottom surface 100. In this case, the side surface 320 may be disposed parallel to the optical axis C. Further, some of lights incident into the light diffusion lens 1 through the incidence surface 200 is refracted through the top surface 310 to be emitted to the outside.

The top surface 310 may be convexly formed in a hemispherical shape or a rotationally symmetrical shape. For example, the top surface 310 may be convexly formed in the optical axis direction (the Z direction).

In this case, the top surface 310 may be symmetrically formed based on an imaginary vertical flat surface passing through the optical axis C. Accordingly, the top surface 310 may implement a symmetrical optical path based on the optical axis C.

The top surface 310 may be formed in a convex shape of which curvature is gradually increased from a central portion of an uppermost end of the top surface 310 toward an edge portion thereof. Alternatively, the central portion of the uppermost end of the top surface 310 may be flatter than the edge portion thereof.

The first protrusion 400 may be convexly formed toward the optical axis C. Accordingly, the first protrusion 400 may be called a first protruding portion or a first protrusion.

A plurality of first protrusions 400 may be formed on the incidence surface 200, and the sum of the plurality of first protrusions 400 may be 30% or less of an entire area of the incidence surface 200.

In embodiments, the plurality of first protrusions 400 are formed to have an area of 30% or less of the entire area of the incidence surface 200. When the first protrusions 400 have an area exceeding 30% of the entire area of the incidence surface 200, the first protrusions 400 affect overall image quality of the light diffusion lens 1. For example, since paths of reflected light and returned light are changed when the entire area of the plurality of first protrusions 400 increases, when the plurality of first protrusions 400 are applied, the sum of the entire area of the plurality of first protrusions 400 are less than or equal to 30% of the entire area of the incidence surface 200.

Referring to FIG. 7, since some of the lights emitted from the light source 10 may be emitted at a predetermined divergence angle $\theta$ based on the optical axis C, the first protrusion 400 is disposed within the divergence angle $\theta$ so that the light is refracted to the top surface 310 of the exit surface 300 and then emitted. Accordingly, the light diffusion lens 1 may secure light diffusivity and light uniformity by changing the optical path of some of the lights, which have directivity in a specific direction, through the first protrusion 400. In this case, the divergence angle $\theta$ may be 50 degrees or less based on the optical axis C. In embodiments, the first protrusion 400 is disposed within 50 degrees based on the optical axis C.

Referring to FIGS. 5 and 6, the first protrusion 400 may be formed of a first curved surface 410 having a predetermined curvature in a vertical cross section. Thus, the first curved surface 410 may convexly be formed on the incidence surface 200 toward the optical axis C.

A center C1 of the first curved surface 410 may be disposed in the light diffusion lens 1. In this case, the center C1 of the first curved surface 410 may be disposed on an imaginary line L passing through a center C2 of the height H1 of the incidence surface 200 in a horizontal direction based on the optical axis direction. In this case, the line L may be disposed above the side surface 320.

Referring to FIG. 5, two first protrusions 400 may be symmetrically disposed based on the optical axis C in the vertical cross section. Accordingly, the light diffusion lens 1 may improve light uniformity in the radial direction. Here, in consideration of the light emitted from the light source 10, two or more or three or more first protrusions 400 may be disposed. Additionally, in consideration of light uniformity in the radial direction, two or more even numbers of first protrusions 400 may be symmetrically disposed based on the optical axis C.

Alternatively, the first protrusion 400 may be formed in a hemispherical shape to protrude from the incidence surface 200. Here, a cross section of the first protrusion 400 may be formed in a circular shape.

Referring to FIG. 1, an edge at which the first protrusion 400 and the incidence surface 200 meet may be formed in a circular shape. Here, the edge at which the first protrusion 400 and the incidence surface 200 meet may be called a first edge.

Accordingly, as shown in FIG. 5, the edge may be formed to have a predetermined diameter D1. Further, the diameter D1 may be formed to be smaller than the first radius R1 which is the maximum radius from the optical axis C to the incidence surface 200.

The edge may include one point P1 at a lower end and one point P2 at an upper end based on the optical axis direction. Here, the one point P1 at the lower end may be called a first point, and the one point P2 at the upper end may be called a second point.

Referring to FIG. 6, in embodiments, the first protrusion 400 is disposed within a predetermined available range based on the radial direction. Here, the available range may indicate a range between a distance R3 from the optical axis C to the one point P1 at the lower end of the edge in the radial direction and a distance R4 from the optical axis C to the one point P2 at the upper end of the edge in the radial direction. In one embodiment, the available range may be a factor which indicates how far the first protrusion 400 is away from the optical axis C in the radial direction.

Therefore, when the first protrusion 400 is disposed outside the available range, a dark portion and a bright portion are generated in an image due to internal reflection of the light diffusion lens 1 such that light uniformity may be degraded. Here, the dark portion may mean an area that is darker than a periphery of light formed using a light diffusion lens. Further, the bright portion may mean an area that is brighter than the periphery of the light formed using the light diffusion lens.

Consequently, the light diffusion lens 1 may secure the light uniformity by locating the first protrusion 400 within the available range.

As shown in FIG. 5, the distance R3 from the optical axis C to the one point P1 at the lower end of the edge may be formed to be greater than the distance R4 from the optical axis C to the one point P2 at the upper end of the edge. The distance R3 from the optical axis C to the one point P1 at the lower end of the edge may be formed to be smaller than the first radius R1 which is the maximum radius.

Therefore, the light diffusion lens 1 may define the distance R3 from the optical axis C to the one point P1 at the lower end of the edge and the distance R4 from the optical axis C to the one point P2 at the upper end of the edge based on the first radius R1, thereby presenting an arrangement position of the first protrusion 400.

Here, the first radius R1 may be 6.1 to 6.2 times a difference R3-R4 between the distance R3 from the optical axis C to the one point P1 at the lower end of the edge and the distance R4 from the optical axis C to the one point P2 at the upper end of the edge. Specifically, the first radius R1 may be 6.12 times the difference R3-R4 between the distance R3 from the optical axis C to the one point P1 at the lower end of the edge and the distance R4 from the optical axis C to the one point P2 at the upper end of the edge.

Further, the diameter D1 of the edge may be formed to be greater than the difference R3-R4 between the distance R3 from the optical axis C to the one point P1 at the lower end of the edge and the distance R4 from the optical axis C to the one point P2 at the upper end of the edge.

Therefore, the light diffusion lens 1 may define the distance R3 from the optical axis C to the one point P1 at the lower end of the edge and the distance R4 from the optical axis C to the one point P2 at the upper end of the edge based on the diameter D1 of the edge, thereby presenting a size of the first protrusion 400.

Here, the diameter D1 of the edge may be 3.3 to 3.4 times the difference R3-R4 between the distance R3 from the optical axis C to the one point P1 at the lower end of the edge and the distance R4 from the optical axis C to the one point P2 at the upper end of the edge. Specifically, the diameter D1 of the edge may be 3.37 times the difference R3-R4 between the distance R3 from the optical axis C to the one point P1 at the lower end of the edge and the distance R4 from the optical axis C to the one point P2 at the upper end of the edge.

Figure 8:
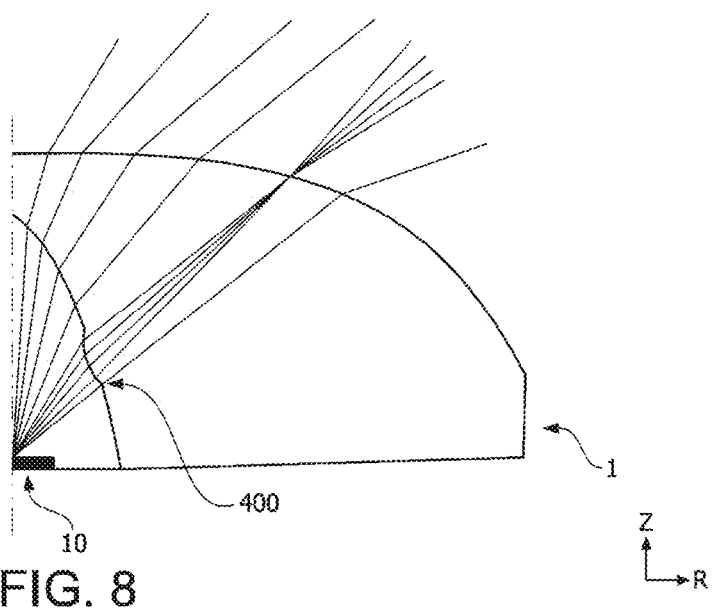
FIG. 8 is a diagram illustrating an optical path due to a first protrusion of the light diffusion lens according to the first embodiment.
Figure 9:
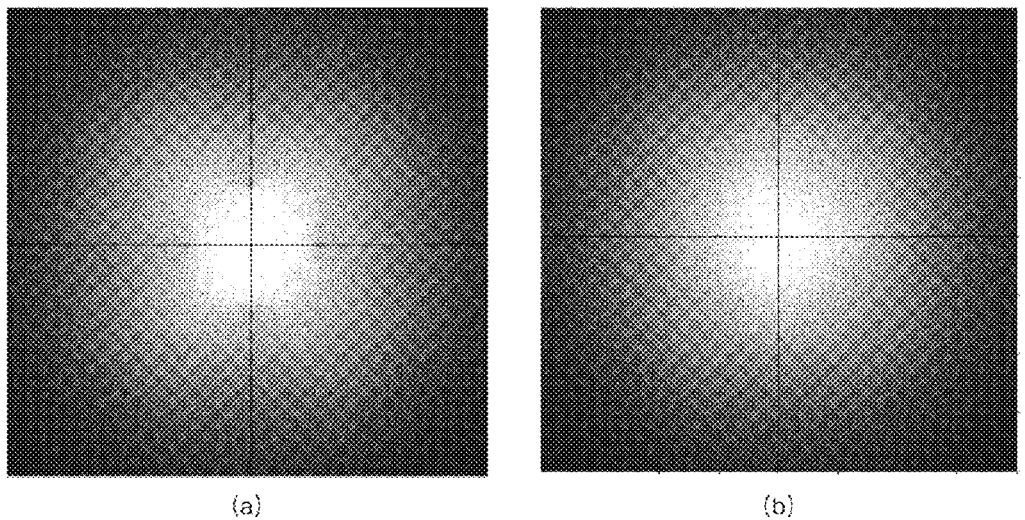
FIG. 9 shows photographs illustrating light distribution before and after application of the first protrusion in the light diffusion lens according to the first embodiment.

FIG. 8 is a diagram illustrating an optical path due to a first protrusion of the light diffusion lens according to the first embodiment, and FIG. 9 shows photographs illustrating before and after application of the first protrusion. Here, FIG. 9A is a photograph illustrating light formed by a light diffusion lens in which a first protrusion is omitted from the light diffusion lens according to the first embodiment, and FIG. 9B is a photograph illustrating light formed by the light diffusion lens, to which the first protrusion is applied, according to the first embodiment.

Referring to FIG. 8, lights incident into the first protrusion 400 may be refracted by the first protrusion 400 to improve light uniformity of the light diffusion lens 1. For example, the lights incident into the first protrusion 400 may be collected by the first protrusion 400 and refracted to the top surface 310. For example, the first protrusion 400 may serve as a converging lens.

Thus, as shown in FIG. 9A, when the first protrusion is omitted from the light diffusion lens according to the first embodiment, a dark portion is formed. However, as shown in FIG. 9B, when the first protrusion 400 is applied to the light diffusion lens 1 according to the first embodiment, it can be confirmed that a dark portion is removed such that light uniformity is improved.

In this case, a five surface emission light-emitting diode (LED) may be used as the light source 10. Accordingly, the first protrusion 400 is disposed in the same radial direction to correspond to a side light-emitting surface 12 such that the light uniformity may be improved.

Figure 10:
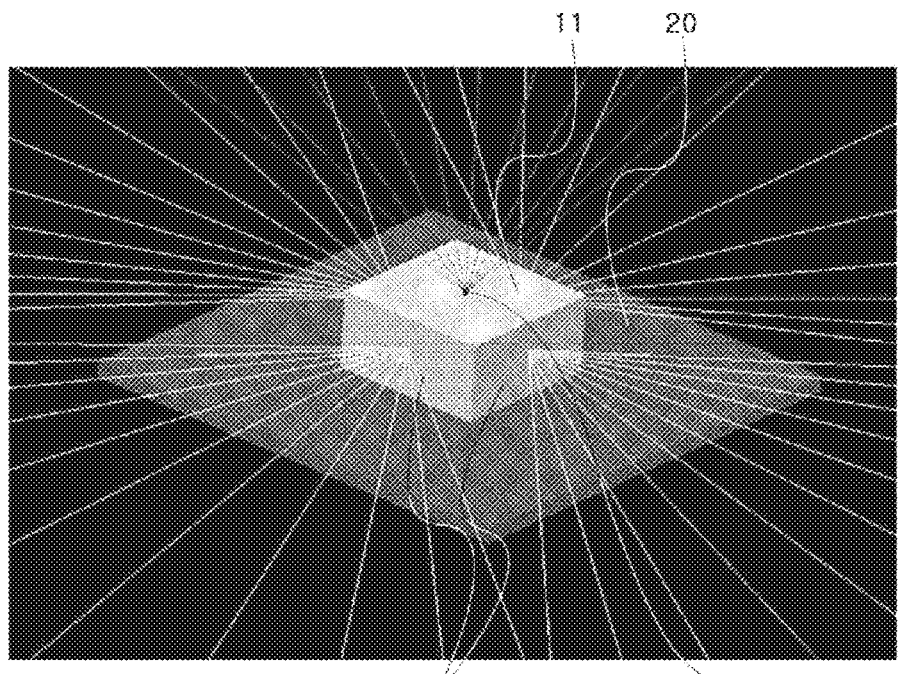
FIG. 10 is a diagram illustrating a light source for emitting light to an incidence surface of the light diffusion lens according to an embodiment.

FIG. 10 is a diagram illustrating a light source for emitting light to an incidence surface of the light diffusion lens according to the first embodiment.

Referring to FIG. 10, the light source 10 emitting light toward the incidence surface 200 may include a top light-emitting surface 11 and four side light-emitting surfaces 12.

Thus, the light source 10 may implement five surface emission. In this case, a bottom surface of the light source 10 may be disposed to be in contact with a top surface of a substrate 20. Here, an example in which the five surface emission LED is used as the light source 10 has been described, but the present disclosure is not necessarily limited thereto.

Light emitted from the top light-emitting surface 11 of the light source 10 may be emitted in the optical axis direction, and light emitted from the side light-emitting surface 12 may be emitted in the radial direction of the light diffusion lens 1. Further, an optical axis apex 11a may be formed at a center of the top light-emitting surface 11. In this case, the optical axis apex 11a may be disposed on a line of the optical axis C.

Further, the first protrusion 400 of the light diffusion lens 1 may be disposed in the same radial direction as the side light-emitting surface 12 to correspond to the side light-emitting surface 12.

Meanwhile, a yellow fluorescent material may be applied to the light source 10.

Second Embodiment

Figure 11:
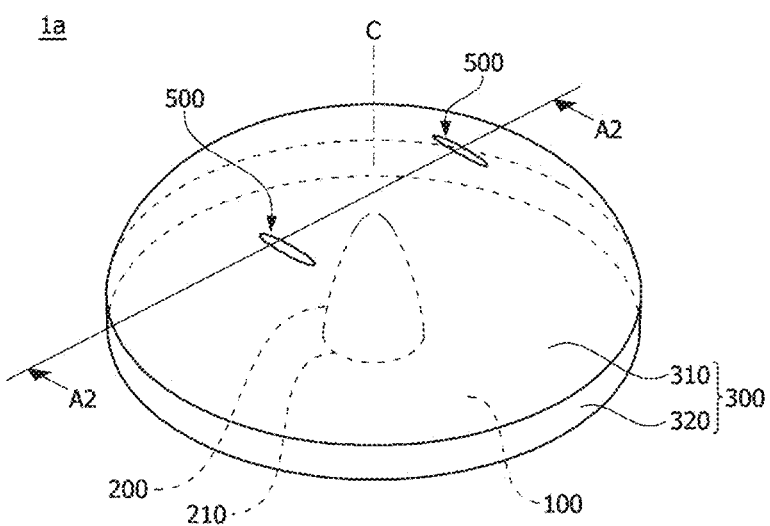
FIG. 11 is a perspective view illustrating a light diffusion lens according to a second embodiment.
Figure 12:
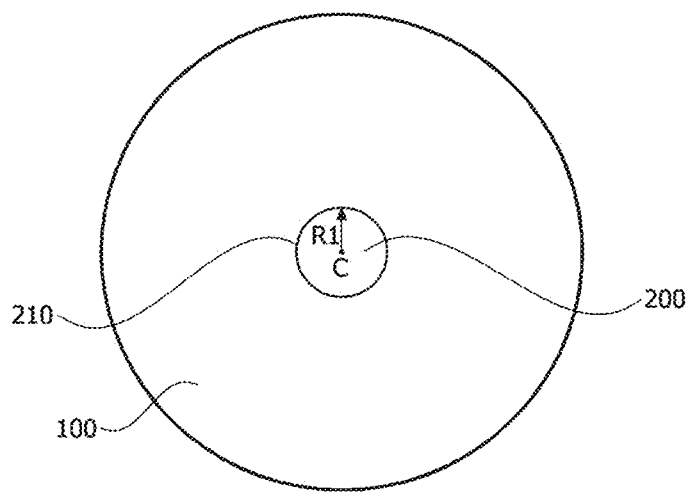
FIG. 12 is a bottom view illustrating the light diffusion lens according to the second embodiment.
Figure 13:
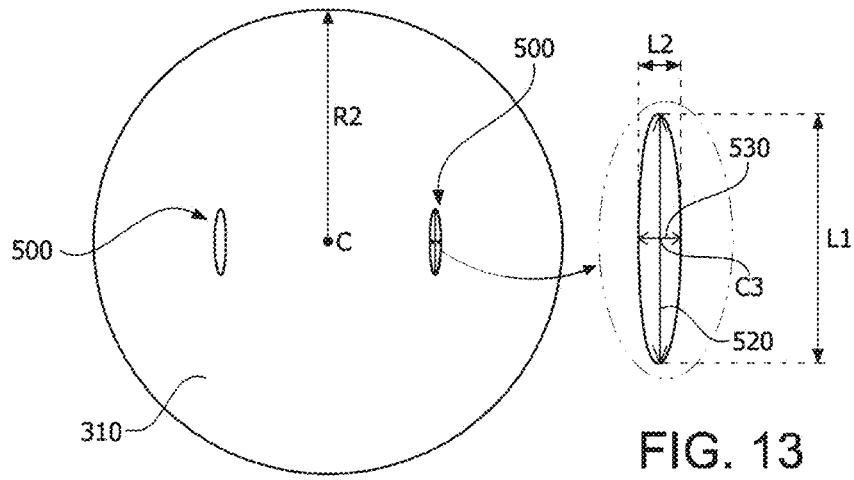
FIG. 13 is a plan view illustrating the light diffusion lens according to the second embodiment.
Figure 14:
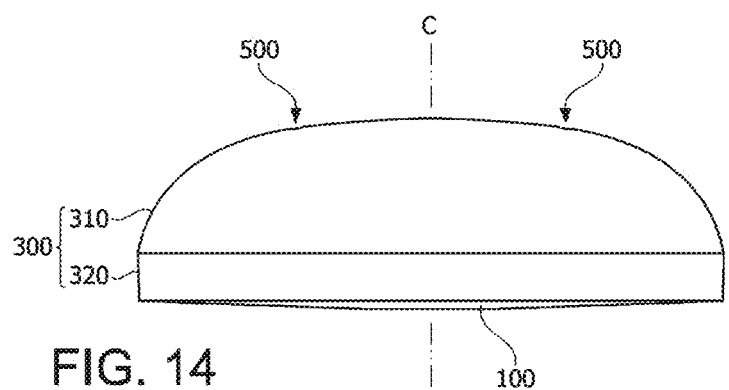
FIG. 14 is a side view illustrating the light diffusion lens according to the second embodiment.
Figure 15:
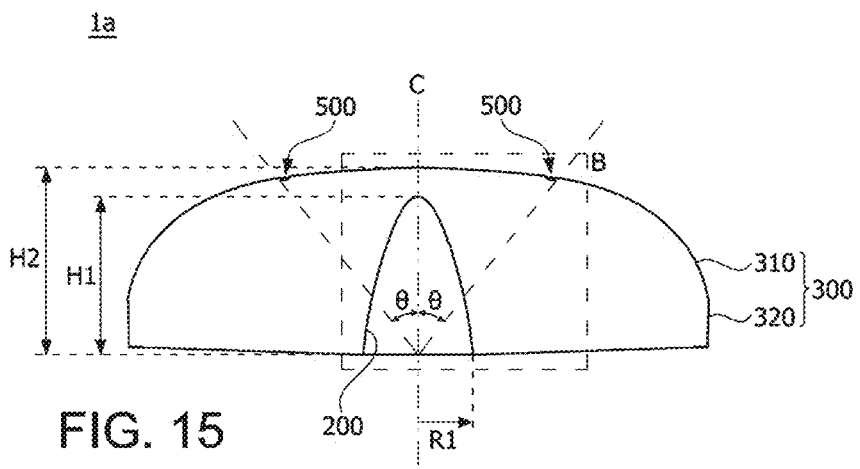
FIG. 15 is a cross-sectional view illustrating the light diffusion lens according to the second embodiment.
Figure 16:
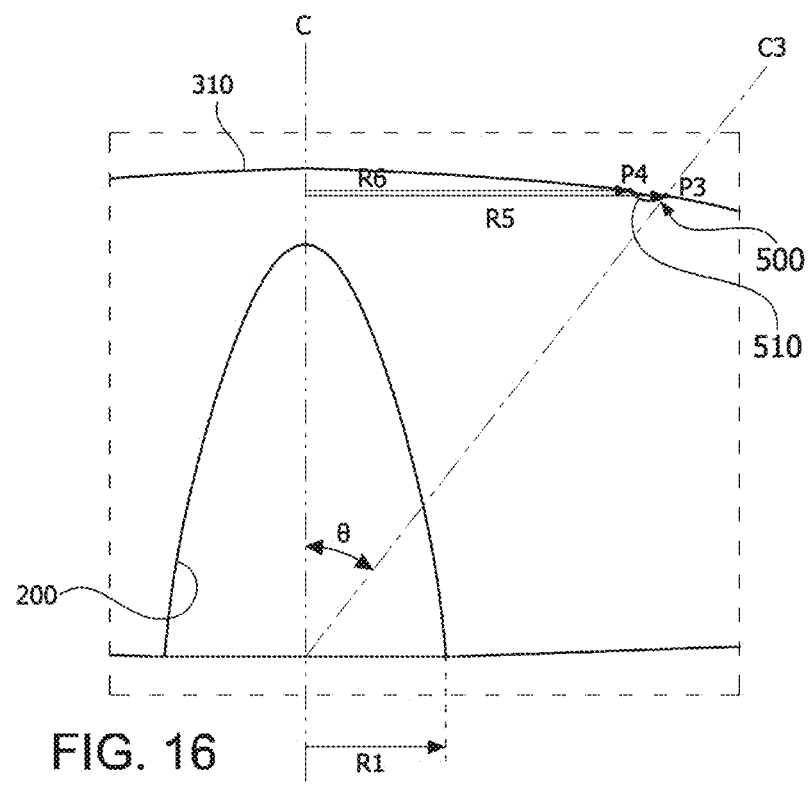
FIG. 16 is an enlarged view illustrating area B of FIG. 15.
Figure 17:
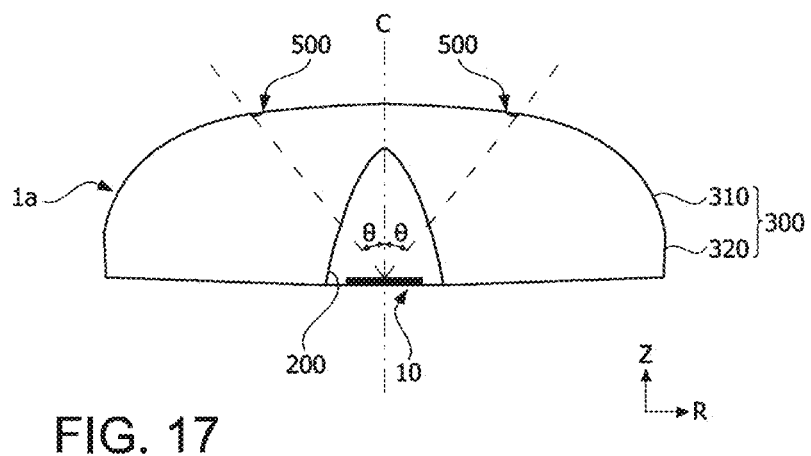
FIG. 17 is a diagram illustrating an arrangement relationship between a light source and the light diffusion lens according to the second embodiment.

FIG. 11 is a perspective view illustrating a light diffusion lens according to a second embodiment, FIG. 12 is a bottom view illustrating the light diffusion lens according to the second embodiment, FIG. 13 is a plan view illustrating the light diffusion lens according to the second embodiment, FIG. 14 is a side view illustrating the light diffusion lens according to the second embodiment, FIG. 15 is a cross-sectional view illustrating the light diffusion lens according to the second embodiment, FIG. 16 is an enlarged view illustrating area B of FIG. 15, and FIG. 17 is a diagram illustrating an arrangement relationship between a light source and the light diffusion lens according to the second embodiment. Here, FIG. 15 is a cross-sectional view taken along line A2-A2 of FIG. 11.

In describing a light diffusion lens 1a according to the second embodiment, the same components as those of the light diffusion lens 1 according to the first embodiment are denoted by the same reference numerals, and thus detailed descriptions thereof will be omitted herein.

Comparing the light diffusion lens 1a according to the second embodiment with the light diffusion lens 1 according to the first embodiment, the light diffusion lens 1a according to the second embodiment is different from the light diffusion lens 1 in that the first protrusions 400 are omitted and second dimples 500 are included.

Referring to FIGS. 11 to 17, the light diffusion lens 1a according to the second embodiment may include a bottom surface 100, an incidence surface 200 into which light is incident, an exit surface 300 from which the light incident through the incidence surface 200 is emitted, and second dimples 500 concavely formed on the exit surface 300. Here, the exit surface 300 may include a top surface 310 and a side surface 320.

Therefore, the light diffusion lens 1a may diffuse light emitted from a light source 10 using the aspherical-shaped incidence surface 200, the exit surface 300, and the second dimples 500 formed on the exit surface 300.

In embodiments, in the light diffusion lens 1a, since an optical path of the light emitted from the light source 10 is changed due to shapes of the incidence surface 200 and the exit surface 300 and the second dimples 500, the incidence surface 200 which is formed in the aspherical shape, the shape of the exit surface 300, and arrangements, shapes, and sizes of the second dimples 500 act as largest factors of light distribution according to the change of the optical path of the light.

The second dimple 500 may be concavely formed on the top surface 310 of the exit surface 300 toward an optical axis C. Accordingly, the second dimple 500 may be called a first concave portion or a first groove.

Referring to FIG. 17, since some of the lights emitted from the light source 10 may be emitted at a predetermined divergence angle θ based on the optical axis C, the second dimple 500 is disposed within the divergence angle θ so that the light is refracted to be emitted. Accordingly, the light diffusion lens 1a may secure light diffusivity and light uniformity by changing the optical path of some of the lights, which have directivity in a specific direction, through the second dimple 500. In this case, the divergence angle θ may be 50 degrees or less based on the optical axis C. Specifically, a center C3 at which a long axis 520 and a short axis 530 of the second dimple 500 meet may be disposed within 34 to 40 degrees based on the optical axis C. Preferably, the center C3 of the second dimple 500 may be disposed at an angle of 37 degrees based on the optical axis C.

Referring to FIG. 15, the second dimple 500 may include a second curved surface 510 which is formed of a curved surface in a vertical cross section. Thus, the second curved surface 510 may be concavely formed on the exit surface 300 toward the optical axis C. In this case, a cross section of the second dimple 500 may be formed in an elliptical shape including a long axis and a short axis.

Referring to FIG. 15, two second dimples 500 may be symmetrically disposed based on the optical axis C in the vertical cross section. Accordingly, the light diffusion lens 1a may improve light uniformity in the radial direction. Here, in consideration of the light emitted from the light source 10, two or more or three or more second dimples 500 may be disposed. Additionally, in consideration of light uniformity in the radial direction, two or more even numbers of second dimples 500 may be disposed to face each other based on the optical axis C.

Referring to FIGS. 11 and 13, an edge at which the second dimple 500 and the exit surface 300 meet may be formed in an elliptical shape. Here, the edge at which the second dimple 500 and the exit surface 300 meet may be called a second edge.

Accordingly, as shown in FIG. 13, the edge may be formed in an elliptical shape including the long axis 520 and the short axis 530.

Referring to FIG. 16, the edge at which the second dimple 500 and the exit surface 300 meet may include one point P3 at a lower end and one point P4 at an upper end based on the optical axis direction. Here, the one point P3 at the lower end may be called a third point, and the one point P4 at the upper end may be called a fourth point.

Referring to FIG. 16, in embodiments, the second dimple 500 is disposed within a predetermined available range based on the radial direction. Here, the available range may indicate a range between a distance R5 from the optical axis C to the one point P3 at the lower end of the edge in the radial direction and a distance R6 from the optical axis C to the one point P4 at the upper end of the edge in the radial direction.

Therefore, when the second dimple 500 is disposed outside the available range, a dark portion and a bright portion are generated in an image due to external refraction of the light diffusion lens 1a such that light uniformity may be degraded.

Consequently, the light diffusion lens 1a may secure the light uniformity by locating the second dimple 500 within the available range.

As shown in FIG. 15, the distance R5 from the optical axis C to the one point P3 at the lower end of the edge may be formed to be greater than the distance R6 from the optical axis C to the one point P4 at the upper end of the edge. Further, the distance R6 from the optical axis C to the one point P4 at the upper end of the edge may be formed to be greater than the first radius R1 which is the maximum radius.

Therefore, the light diffusion lens 1a may define the distance R5 from the optical axis C to the one point P3 at the lower end of the edge and the distance R6 from the optical axis C to the one point P4 at the upper end of the edge based on the first radius R1, thereby presenting an arrangement position of the second dimple 500.

Here, the first radius R1 may be 4.4 to 4.5 times a difference R5-R6 between the distance R5 from the optical axis C to the one point P3 at the lower end of the edge and the distance R6 from the optical axis C to the one point P4 at the upper end of the edge. Specifically, the first radius R1 may be 4.47 times the difference R5-R6 between the distance R5 from the optical axis C to the one point P3 at the lower end of the edge and the distance R6 from the optical axis C to the one point P4 at the upper end of the edge.

Further, a size of the second dimple 500 may be presented according to a ratio between the long axis 520 and the short axis 530 of the edge. In this case, a length L1 of the long axis 520 is greater than a length L2 of the short axis 530. Consequently, the light diffusion lens 1a may increase a diffusion amount of light in a long axis direction of the second dimple 500.

Here, the length L1 of the long axis 520 may be 5.5 to 6.5 times the length L2 of the short axis 530. Specifically, the length L1 of the long axis 520 may be six times the length L2 of the short axis 530.

Further, a radius R2 of the exit surface 300 may be 3.5 times the length L1 of the long axis 520.

Figure 18:
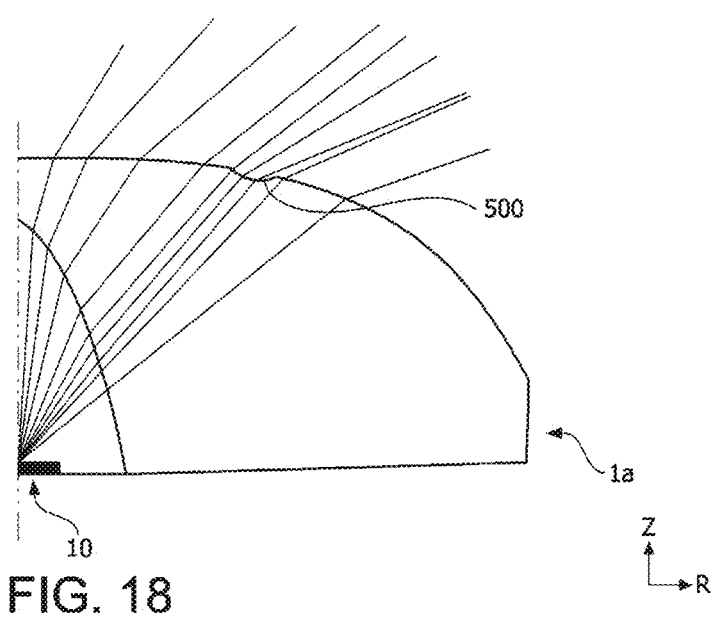
FIG. 18 is a diagram illustrating an optical path due to a second dimple of the light diffusion lens according to the second embodiment.
Figure 19:
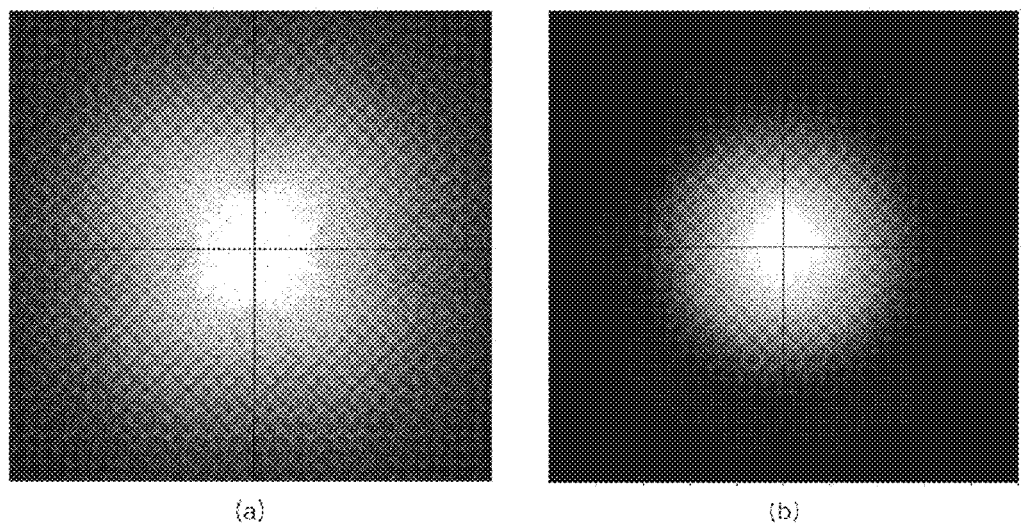
FIG. 19 shows photographs illustrating light distribution before and after application of the second dimple in the light diffusion lens according to the second embodiment.

FIG. 18 is a diagram illustrating an optical path due to a second dimple of the light diffusion lens according to the second embodiment, and FIG. 19 shows photographs illustrating before and after application of the second dimple. Here, FIG. 19A is a diagram illustrating light formed by a light diffusion lens in which a second dimple is omitted from the light diffusion lens according to the second embodiment, and FIG. 19B is a diagram illustrating light formed by the light diffusion lens, to which the second dimple is applied, according to the second embodiment.

Referring to FIG. 18, lights incident into the second dimple 500 may be refracted by the second dimple 500 to improve light uniformity of the light diffusion lens 1a. For example, the lights incident into the second dimple 500 may diverge by the second dimple 500 to be emitted to the outside. For example, the second dimple 500 may serve as a diverging lens.

Thus, as shown in FIG. 19A, when the second dimple is omitted from the light diffusion lens according to the second embodiment, a dark portion is formed. However, as shown in FIG. 19B, when the second dimple 500 is applied to the light diffusion lens 1a according to the second embodiment, it can be confirmed that a dark portion and a bright portion are improved such that light uniformity is improved.

In this case, a five surface emission LED may be used as the light source 10. Accordingly, the second dimple 500 is disposed in the same radial direction to correspond to a side light-emitting surface 12 such that the light uniformity of the light diffusion lens 1a may be improved.

Third Embodiment

Figure 20:
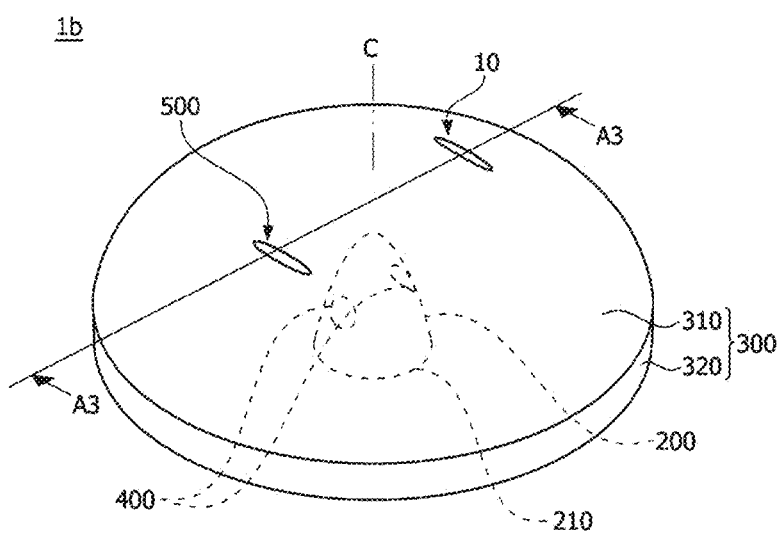
FIG. 20 is a perspective view illustrating a light diffusion lens according to a third embodiment.
Figure 21:
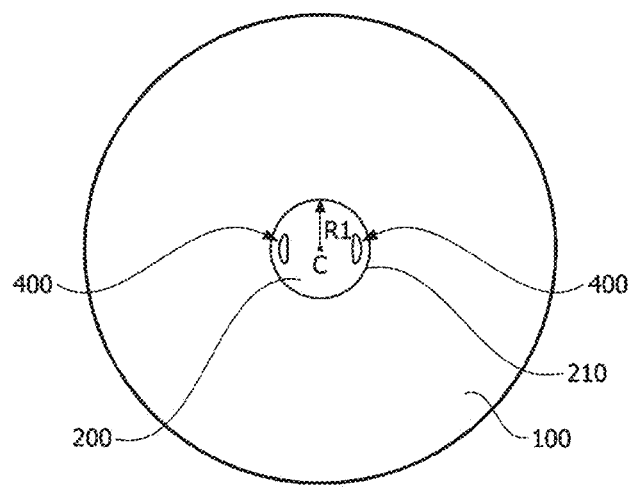
FIG. 21 is a bottom view illustrating the light diffusion lens according to the third embodiment.
Figure 22:
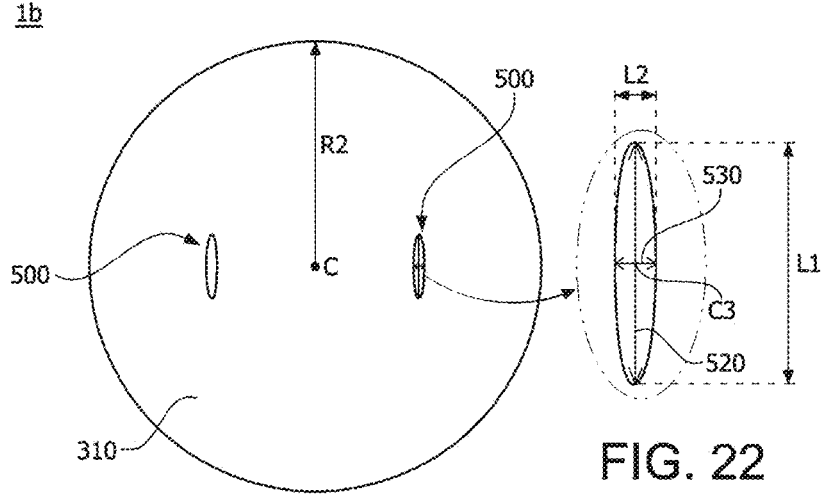
FIG. 22 is a plan view illustrating the light diffusion lens according to the third embodiment.
Figure 23:
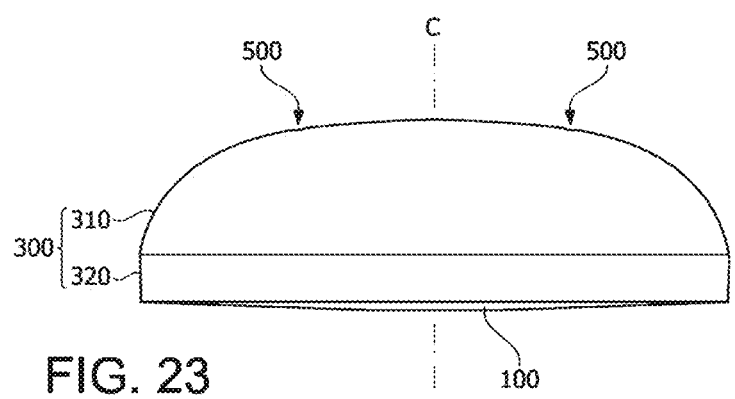
FIG. 23 is a side view illustrating the light diffusion lens according to the third embodiment.
Figure 24:
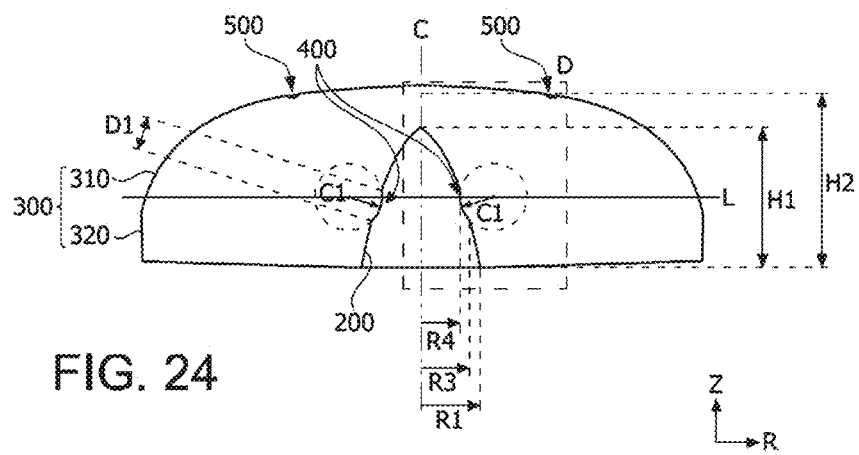
FIG. 24 is a cross-sectional view illustrating the light diffusion lens according to the third embodiment.
Figure 25:
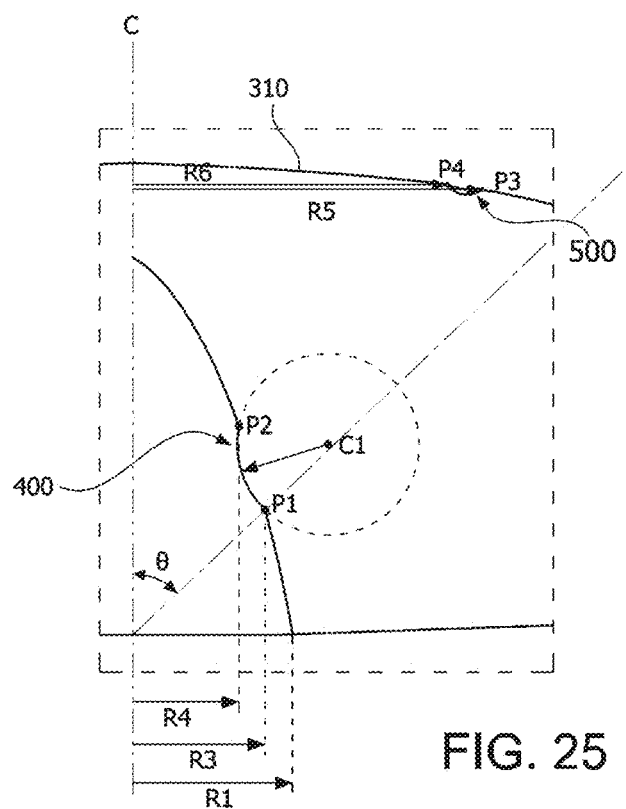
FIG. 25 is an enlarged view illustrating area D of FIG. 24.
Figure 26:
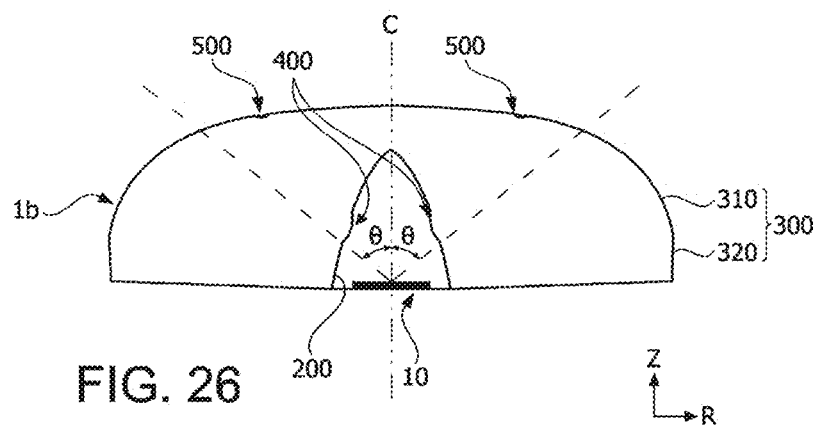
FIG. 26 is a diagram illustrating an arrangement relationship between a light source and the light diffusion lens according to the third embodiment.

FIG. 20 is a perspective view illustrating a light diffusion lens according to a third embodiment, FIG. 21 is a bottom view illustrating the light diffusion lens according to the third embodiment, FIG. 22 is a plan view illustrating the light diffusion lens according to the third embodiment, FIG. 23 is a side view illustrating the light diffusion lens according to the third embodiment, FIG. 24 is a cross-sectional view illustrating the light diffusion lens according to the third embodiment, FIG. 25 is an enlarged view illustrating area D of FIG. 24, and FIG. 26 is a diagram illustrating an arrangement relationship between a light source and the light diffusion lens according to the third embodiment. Here, FIG. 24 is a cross-sectional view taken along line A3-A3 of FIG. 20.

In describing a light diffusion lens 1b according to the third embodiment, the same components as those of the light diffusion lens 1 according to the first embodiment and the light diffusion lens 1a according to the second embodiment are denoted by the same reference numerals, and thus detailed descriptions thereof will be omitted herein.

Comparing the light diffusion lens 1b according to the third embodiment with the light diffusion lens 1 according to the first embodiment, the light diffusion lens 1b according to the third embodiment is different from the light diffusion lens 1 in that second dimples 500 are further included.

Referring to FIGS. 20 to 26, the light diffusion lens 1b according to the third embodiment may include a bottom surface 100, an incidence surface 200 into which light is incident, an exit surface 300 from which the light incident through the incidence surface 200 is emitted, first protrusions 400 convexly formed on the incidence surface 200, and second dimples 500 concavely formed on the exit surface 300. Here, the exit surface 300 may include a top surface 310 and a side surface 320.

Therefore, the light diffusion lens 1b may diffuse light emitted from a light source 10 using the aspherical-shaped incidence surface 200, the exit surface 300, the first protrusions 400 formed on the incidence surface 200, and the second dimples 500 formed on the exit surface 300.

In embodiments, in the light diffusion lens 1b, since an optical path of the light emitted from the light source 10 is changed due to shapes of the incidence surface 200 and the exit surface 300, the first protrusions 400, and the second dimples 500, the incidence surface 200 which is formed in the aspherical shape, the shape of the exit surface 300, and arrangements, shapes, and sizes of the second dimples 500 act as largest factors of light distribution according to the change of the optical path of the light. In this case, the second dimple 500 may be formed to correspond to light refracted due to the first protrusion 400.

The second dimple 500 may be concavely formed on the top surface 310 of the exit surface 300 toward an optical axis C. Accordingly, the second dimple 500 may be called a concave portion.

Referring to FIG. 26, since some of the lights emitted from the light source 10 may be emitted at a predetermined divergence angle θ based on the optical axis C, the first protrusion 400 and the second dimple 500 are disposed within the divergence angle θ so that the light is refracted to be emitted. Accordingly, the light diffusion lens 1b may secure light diffusivity and light uniformity by changing the optical path of some of the lights, which have directivity in a specific direction, through the first protrusion 400 and the second dimple 500. In this case, the divergence angle θ may be 50 degrees or less based on the optical axis C.

In this case, a divergence angle applied to arrange the second dimple 500 based on the optical axis C may be smaller than a divergence angle for application of the first protrusion 400. In one embodiment, as shown in FIG. 26, the second dimple 500 may be disposed close to the optical axis C based on the divergence angle for application of the first protrusion 400.

Referring to FIG. 24, two first protrusions 400 and two second dimples 500 may be symmetrically disposed based on the optical axis C in a vertical cross section. Accordingly, the light diffusion lens 1b may improve light uniformity in the radial direction. Here, in consideration of the light emitted from the light source 10, two or more first protrusions 400 and two or more second dimples 500 may be disposed. Additionally, in consideration of optical uniformity in the radial direction, two or more even numbers of first protrusions 400 and two or more even numbers of second dimples 500 may be disposed to face each other based on the optical axis C.

In this case, as shown in FIGS. 20 and 24, the first protrusion 400 and the second dimple 500 may be disposed in the same radial direction.

Meanwhile, an edge at which the first protrusion 400 and the incidence surface 200 meet may be formed in a circular shape having a predetermined diameter D1. Further, an edge at which the second dimple 500 and the exit surface 300 meet may be formed in an elliptical shape including a long axis 520 and a short axis 530. In this case, the diameter D1 of the edge at which the first protrusion 400 and the incidence surface 200 meet may be smaller than a length L1 of the long axis 520 of the edge at which the second dimple 500 and the exit surface 300 meet. In this case, the diameter D1 of the edge at which the first protrusion 400 and the incidence surface 200 meet may be greater than a length L2 of the short axis 530 of the edge at which the second dimple 500 and the exit surface 300 meet.

Figure 27:
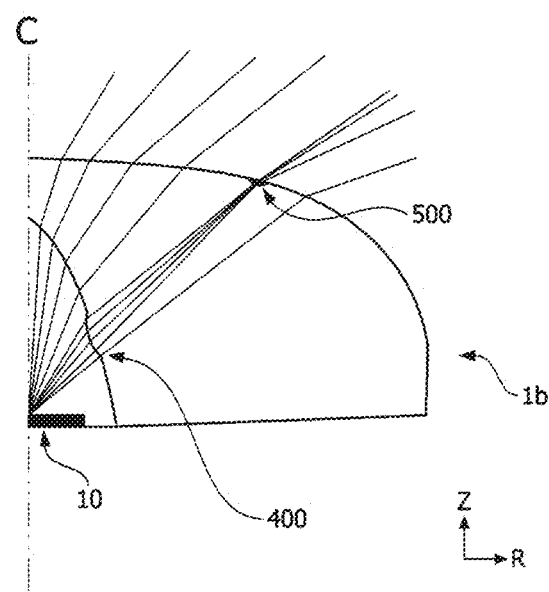
FIG. 27 is a diagram illustrating an optical path due to a first protrusion and a second dimple of the light diffusion lens according to the third embodiment.

FIG. 27 is a diagram illustrating an optical path due to a second dimple of the light diffusion lens according to the second embodiment.

Referring to FIG. 27, lights incident into the first protrusion 400 may be collected by the first protrusion 400 and incident into the second dimple 500. Further, the lights incident into the second dimple 500 may be diffused by the second dimple 500 and emitted to the outside.

Consequently, the light diffusion lens 1b may further improve light uniformity by applying the second dimple 500 to an area of a minute dark portion or a minute bright portion which is not resolved through the application of the first protrusion 400.

Meanwhile, a five surface emission LED may be used as the light source 10. Accordingly, a plurality of the first protrusions 400 and a plurality of the second dimples 500 are disposed in the same radial direction to correspond to a side light-emitting surface 12 such that the light uniformity of the light diffusion lens 1b may be improved.

Fourth Embodiment

Figure 28:
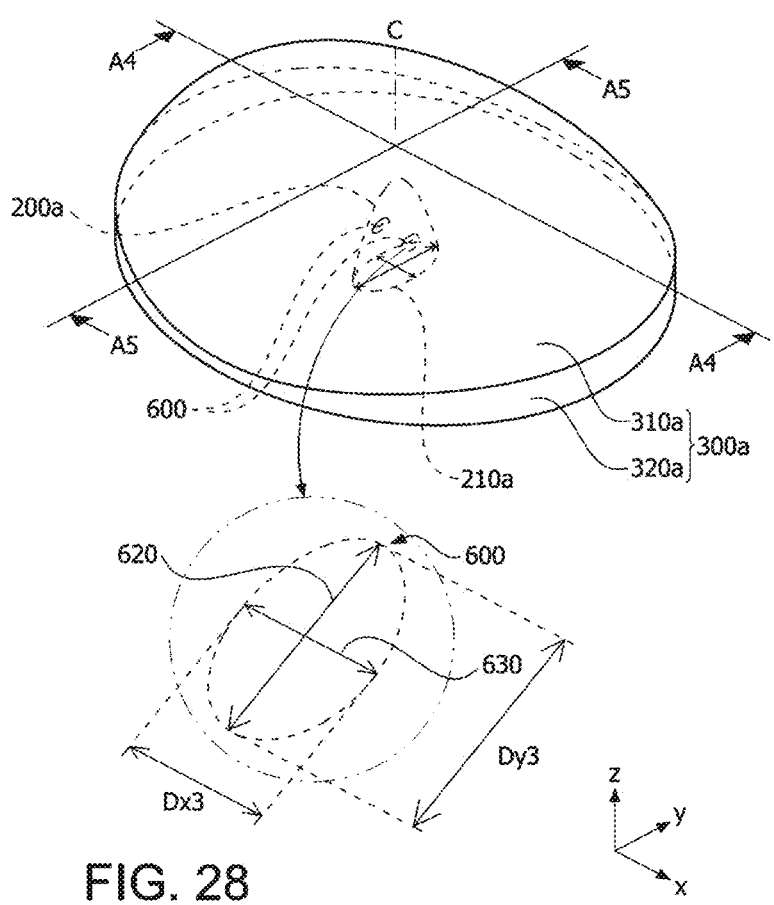
FIG. 28 is a perspective view illustrating a light diffusion lens according to a fourth embodiment.
Figure 29:
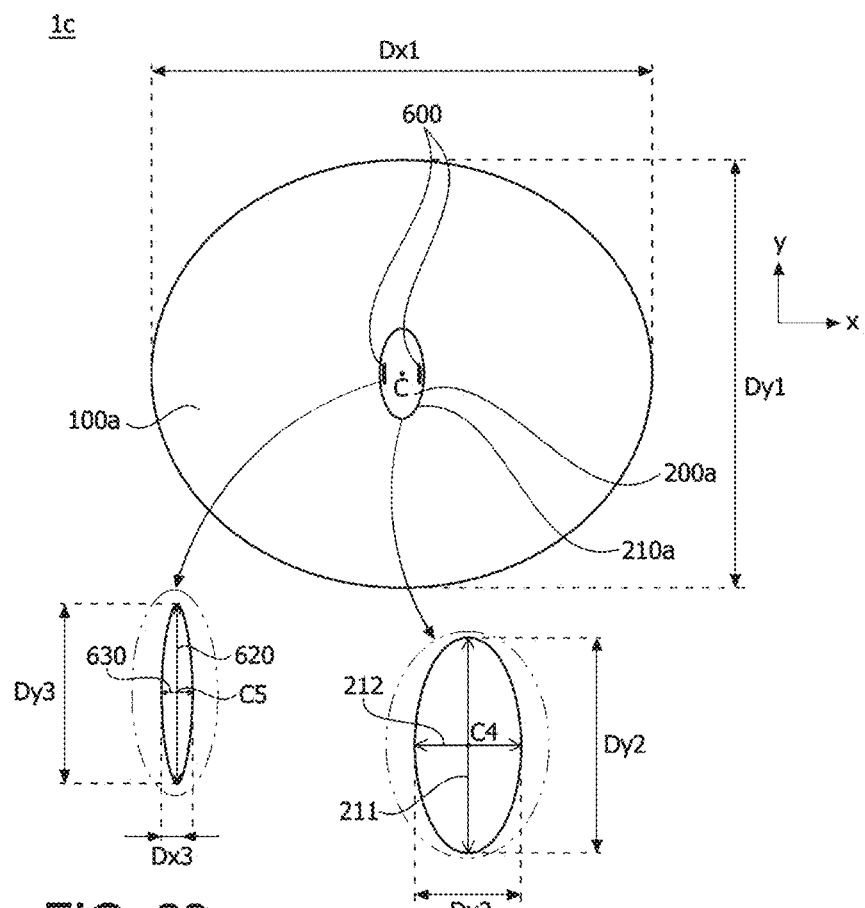
FIG. 29 is a bottom view illustrating the light diffusion lens according to the fourth embodiment.
Figure 30:
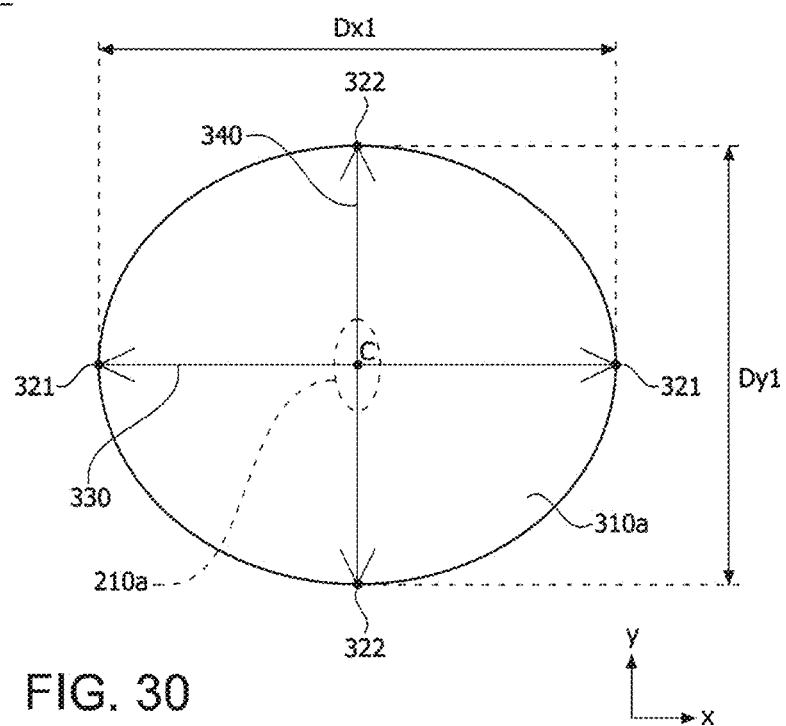
FIG. 30 is a plan view illustrating the light diffusion lens according to the fourth embodiment.
Figure 31:
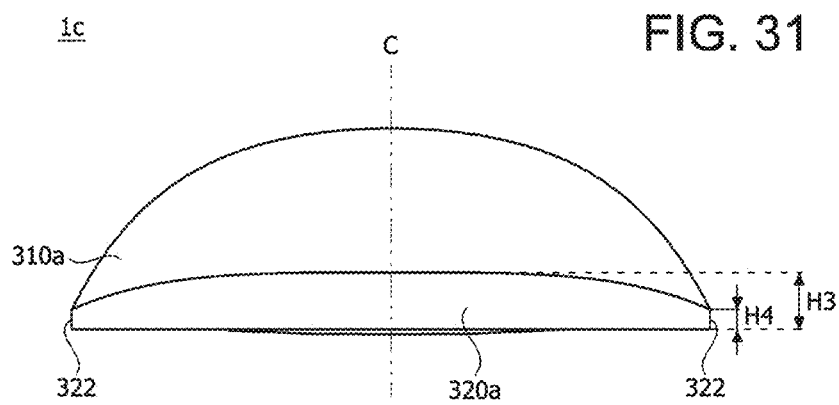
FIG. 31 is a front view illustrating the light diffusion lens according to the fourth embodiment.
Figure 32:
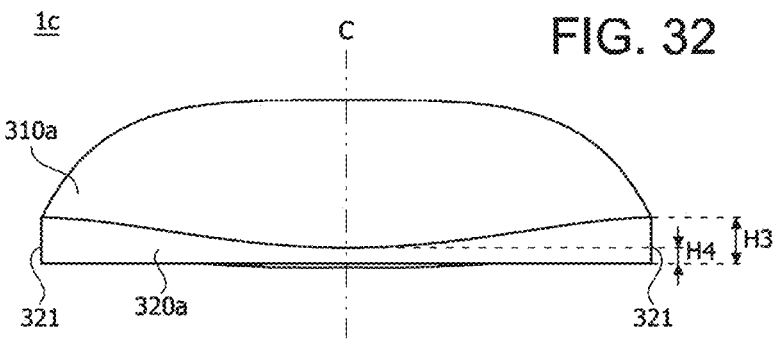
FIG. 32 is a side view illustrating the light diffusion lens according to the fourth embodiment.
Figure 33:
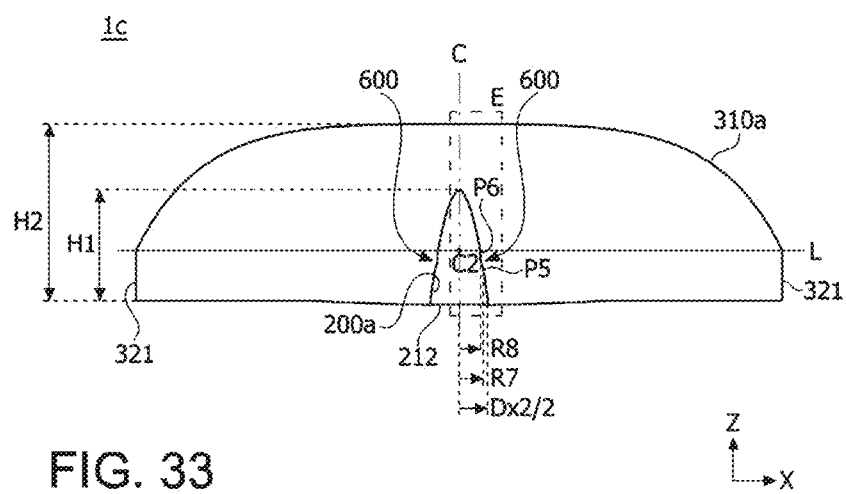
FIG. 33 is a cross-sectional view in a long axis direction based on an exit surface of the light diffusion lens according to the fourth embodiment.
Figure 34:
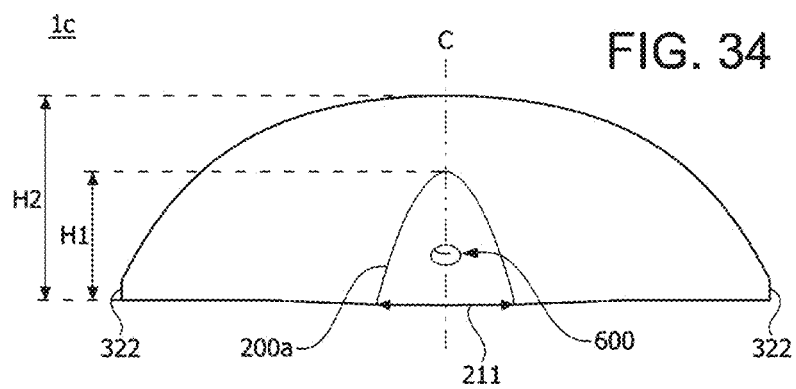
FIG. 34 is a cross-sectional view in a short axis direction based on the exit surface of the light diffusion lens according to the fourth embodiment.
Figure 35:
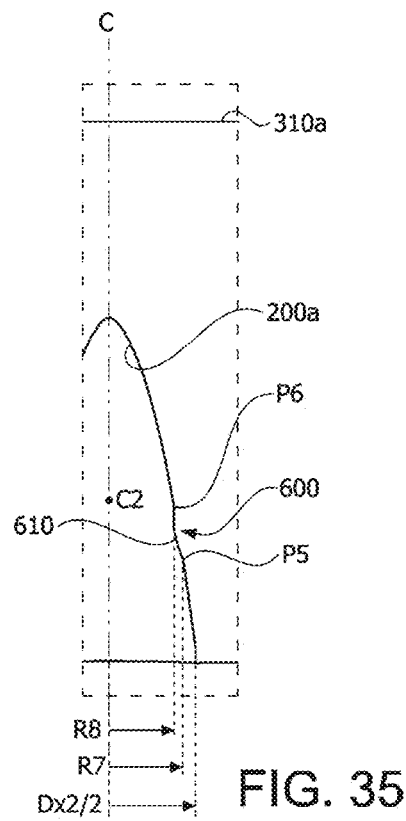
FIG. 35 is an enlarged view illustrating area E of FIG. 33.

FIG. 28 is a perspective view illustrating a light diffusion lens according to a fourth embodiment, FIG. 29 is a bottom view illustrating the light diffusion lens according to the fourth embodiment, FIG. 30 is a plan view illustrating the light diffusion lens according to the fourth embodiment, FIG. 31 is a front view illustrating the light diffusion lens according to the fourth embodiment, FIG. 32 is a side view illustrating the light diffusion lens according to the fourth embodiment, FIG. 33 is a cross-sectional view in a long axis direction based on an exit surface of the light diffusion lens according to the fourth embodiment, FIG. 34 is a cross-sectional view in a short axis direction based on the exit surface of the light diffusion lens according to the fourth embodiment, and FIG. 35 is an enlarged view illustrating area E of FIG. 33. Here, FIG. 33 is a cross-sectional view taken along line A4-A4 of FIG. 28, and FIG. 34 is a cross-sectional view taken along line A5-A5 of FIG. 28. In FIG. 28, an x direction indicates a long axis direction based on an exit surface, a y direction indicates a short axis direction based on the exit surface, and a z direction indicates an axial direction or an optical axis direction.

Meanwhile, an optical axis C may be a center of light emitted from a light source 10 and may coincide with a center of a light diffusion lens 1c.

Comparing the light diffusion lens 1c according to the fourth embodiment with the light diffusion lens 1 according to the first embodiment, the light diffusion lens 1c according to the fourth embodiment is different from the light diffusion lens 1 in that each of a bottom surface 100a, an incidence hole 210a, an exit surface 300a, and third protrusions 600 is formed to have a long axis and a short axis.

Referring to FIGS. 28 to 33, the light diffusion lens 1c according to the fourth embodiment may include the bottom surface 100a, an incidence surface 200a concavely formed inward the bottom surface 100a to form the incidence hole 210a, the exit surface 300a from which light incident through the incidence surface 200a is emitted, and the third protrusions 600 convexly formed on the incidence surface 200a. Here, the exit surface 300a may be formed to have a first long axis 330 with a predetermined first long axis length Dx1 and a first short axis 340 with a predetermined first short axis length Dy1. Thus, the incidence surface 200a may also be formed to have the first long axis length Dx1 and the first short axis length Dy1. Further, the exit surface 300a may include a top surface 310a and a side surface 320a.

Therefore, the light diffusion lens 1c may diffuse the light emitted from the light source 10 using the aspherical-shaped incidence surface 200a, the exit surface 300a, and the third protrusions 600 formed on the incidence surface 200a.

In embodiments, in the light diffusion lens 1c, since an optical path of the light emitted from the light source 10 is changed due to shapes of the incidence surface 200a and the exit surface 300a and the third protrusions 600, the shapes and arrangement of the incidence surface 200a, which is formed in the aspherical shape, and the exit surface 300a, and arrangements, shapes, and sizes of the third protrusions 600 act as largest factors of light distribution according to the change of the optical path of the light.

Referring to FIG. 29, the incidence hole 210a may be disposed at a center of the bottom surface 100a. Further, since the bottom surface 100a is disposed below the exit surface 300a, the bottom surface 100a may be formed to have the first long axis length Dx1 and the first short axis length Dy1. Accordingly, the bottom surface 100a may be formed in an elliptical shape.

Further, the bottom surface 100a may be formed in a downwardly convex shape or a flat surface shape.

The downwardly convex-shaped bottom surface 100a may be a curved surface having a curvature that is greater than that of a central portion of the top surface 310a.

An example of the bottom surface 100a includes a bottom surface formed of a curved surface having a downwardly convex shape, but the present disclosure is not necessarily limited thereto. For example, in the bottom surface 100a, a flat surface may be formed from an edge to a predetermined length in a center direction, and a lower convex surface may be formed from a position at which the flat surface ends to a center side. In embodiments, the bottom surface 100a may have a shape of which curvature is zero from the edge to a predetermined length in the center direction and increases and then decreases again to the center of the bottom surface 100a from the predetermined length.

When compared with a bottom surface comprised of only the flat surface, the bottom surface 100a having the lower convex surface may totally reflect more light, which is emitted to the lower side, toward the upper side among lights emitted from the light source 10.

Here, in order to preferentially totally reflect the light due to the lower convex surface, the flat surface may be disposed outside the lower convex surface.

Further, the bottom surface 100a of a flat surface shape may be formed to be inclined from an end portion of a lower side of the side surface 320a toward the optical axis C. For example, the bottom surface 100a of a flat surface shape may be a flat surface which is formed to be inclined with respect to an imaginary horizontal surface at a predetermined angle based on the end portion of the lower side of the side surface 320a. Accordingly, the bottom surface 100a may totally reflect more light, which is emitted to the lower side, toward the upper side among lights emitted from the light source 10.

The incidence surface 200a is a surface portion through which the light emitted from the light source 10 located in the incidence hole 210a is incident into the light diffusion lens 1c.

As shown in FIGS. 28, 33, and 34, the aspherical-shaped incidence surface 200a may be formed to be concave inward the bottom surface 100a from the center thereof. Accordingly, the incidence hole 210a may be formed at the center of the bottom surface 100a.

A vertical cross section of the incidence surface 200a may be formed in a semi-elliptical shape, a semi-rugby ball shape, or a parabolic shape. Accordingly, the incidence surface 200a may be formed of an aspherical surface. In this case, the incidence surface 200a may be formed to have a predetermined height H1 from the bottom surface 100a based on the optical axis direction.

Referring to FIGS. 28 and 29, since the incidence surface 200a extends upward from the incidence hole 210a, a horizontal cross section of the incidence surface 200a may have an elliptical shape. In this case, since the vertical cross section of the incidence surface 200a is formed in a semi-elliptical shape, a semi-rugby ball shape, or a parabolic shape, the horizontal cross section of the incidence surface 200a may be decreased toward the upper side.

The incidence hole 210a may include a second long axis 211 formed with a second long axis length Dy2 and a second short axis 212 formed with a second short axis length Dx2. Here, when the exit surface 300a is viewed in the optical axis direction, the second short axis 212 of the incidence hole 210a may be disposed to overlap the first long axis 330 of the exit surface 300a. In this case, the second short axis length Dx2 of the second short axis 212 is smaller than the first long axis length Dx1 of the first long axis 330.

Further, a center C4 of the incidence hole 210a may be disposed on the optical axis C, and the light source 10 may be disposed at a center of the incidence hole 210a. Accordingly, an air layer may be disposed between the light source 10 and the incidence surface 200a. Thus, light emitted from the light source 10 to the air layer may be refracted at the incidence surface 200a of the light diffusion lens 1c having a different refractive index.

The exit surface 300a may be a surface of the light diffusion lens 1c from which the light incident through the incidence surface 200a is emitted and may be formed to be rotationally symmetrical based on the optical axis C. Thus, as shown in FIG. 30, when viewed in the optical axis direction, the exit surface 300a may be formed to have the first long axis 330 with the predetermined first long axis length Dx1 and the first short axis 340 with the predetermined first short axis length Dy1. For example, the exit surface 300a may be formed in an elliptical shape.

Further, a height H2 of the exit surface 300a is greater than the height H1 of the incidence surface 200a based on the optical axis direction.

Referring to FIGS. 31 and 32, the exit surface 300a may include the convex-shaped top surface 310a and the side surface 320a disposed between the top surface 310a and the bottom surface 100a. In this case, the side surface 320a may be disposed parallel to the optical axis C. Further, some of lights incident into the light diffusion lens 1c through the incidence surface 200a is refracted through the top surface 310a to be emitted to the outside.

The top surface 310a may be convexly formed in a non-hemispherical shape or a rotationally symmetrical shape. For example, the top surface 310a may be convexly formed in the optical axis direction (the Z direction).

In this case, the top surface 310a may be symmetrically formed based on an imaginary vertical flat surface passing through the optical axis C. For example, the top surface 310a may implement a symmetrical optical path with respect to the first long axis 330 or the first short axis 340 based on the optical axis C.

The top surface 310a may be formed in a convex shape of which curvature is gradually increased from a central portion of an uppermost end of the top surface 310a toward an edge portion thereof. Alternatively, the central portion of the uppermost end of the top surface 310a may be flatter than the edge portion thereof.

Meanwhile, the light diffusion lens 1c may implement asymmetric light distribution while improving light diffusivity and image quality using the side surface 320a which forms a free curve so as to generate a height difference on the upper side of the exit surface 300a.

As shown in FIG. 28, since the upper side of the side surface 320a is formed in a curved shape, the side surface 320a may include a pair of first side portions 321, each having a first height H3, and a pair of second side portions 322, each having a second height H4. Here, the pair of first side portions 321 and the pair of second side portions 322 are respectively disposed to face each other based on the optical axis C. In this case, the first height H3 is formed to be higher than the second height H4 based on the bottom surface 100a or an edge of a lower side of the side surface 320a. Thus, the first height H3 may be a maximum height of the side surface 320a, and the second height H4 may be a minimum height of the side surface 320a.

Referring to FIGS. 30, 33, and 34, the first side portion 321 may be disposed in the short axis direction of the incidence hole 210a, and the second side portion 322 may be disposed in the long axis direction of the incidence hole 210a. Alternatively, the first side portion 321 may be disposed in the long axis direction of the exit surface 300a, and the second side portion 322 may be disposed in the short axis direction of the exit surface 300a.

At this time, in order to prevent formation of moire to improve light uniformity of the light diffusion lens 1c, a ratio Hr between the first height H1 of the first side portion 321 and the second height H2 of the second side portion 322 may be designed in consideration of a ratio of the second short axis 212 to the second long axis 211 of the incidence hole 210a.

Meanwhile, an area in which the top surface 310a and the side surface 320a meet may be formed in a curved shape. Here, the curved shape may be formed to have a predetermined curvature. As shown in FIG. 28, the upper side of the side surface 320a may be formed in a curved shape in which the height of the side surface 320a is decreased from the first side portion 321 toward the second side portion 322.

The third protrusion 600 may be convexly formed toward the optical axis C. Accordingly, the third protrusion 600 may be called a second protruding portion or a second protrusion.

A plurality of third protrusions 600 may be formed on the incidence surface 200a, and the sum of the plurality of third protrusions 600 may be 30% or less of an entire area of the incidence surface 200a.

In embodiments, the plurality of third protrusions 600 are formed to have an area of 30% or less of the entire area of the incidence surface 200a. When the third protrusions 600 have an area exceeding 30% of the entire area of the incidence surface 200a, the third protrusions 600 affect overall image quality of the light diffusion lens 1c. For example, since paths of reflected light and returned light are changed when the entire area of the plurality of third protrusions 600 increases, when the plurality of third protrusions 600 are applied, the sum of the entire area of the plurality of third protrusions 600 are less than or equal to 30% of the entire area of the incidence surface 200a.

Figure 36:
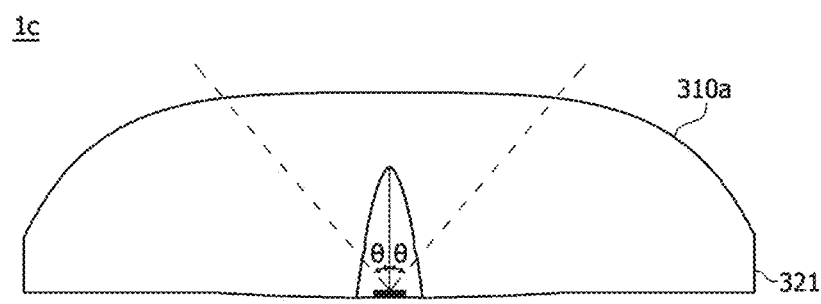
FIG. 36 is a diagram illustrating an arrangement relationship between a light source and the light diffusion lens according to the fourth embodiment.

FIG. 36 is a diagram illustrating an arrangement relationship between a light source and the light diffusion lens according to the fourth embodiment.

Referring to FIG. 36, since some of the lights emitted from the light source 10 may be emitted at a predetermined divergence angle θ based on the optical axis C, the third protrusion 600 is disposed within the divergence angle θ so that the light is refracted to the top surface 310a of the exit surface 300a and then emitted. Accordingly, the light diffusion lens 1c may secure light diffusivity and light uniformity by changing the optical path of some of the lights, which have directivity in a specific direction, through the third protrusion 600. In this case, the divergence angle θ may be 50 degrees or less based on the optical axis C. In one embodiment, the third protrusion 600 is disposed within 50 degrees based on the optical axis C.

Referring to FIGS. 33 and 35, the third protrusion 600 may be formed of a third curved surface 610 which is formed of a curved surface in a vertical cross section. Thus, the third curved surface 610 may be convexly formed on the incidence surface 200a toward the optical axis C.

Referring to FIG. 33, two third protrusions 600 may be symmetrically disposed based on the optical axis C in the vertical cross section. Accordingly, the light diffusion lens 1c may improve light uniformity in the long axis direction of the exit surface 300a. Here, in consideration of the light emitted from the light source 10, two or more or three or more third protrusions 600 may be disposed. Additionally, in consideration of light uniformity in the long axis direction of the exit surface 300a, two third protrusions 600 may be symmetrically disposed based on the optical axis C.

Meanwhile, a cross section of the third protrusion 600 may be formed in an elliptical shape to protrude from the incidence surface 200a. Accordingly, the third protrusion 600 may include a third long axis 620 with a predetermined third long axis length Dy3 and a third short axis 630 with a predetermined third short axis length Dx3. Here, when the exit surface 300a is viewed, the third short axis 630 of the third protrusion 600 may be disposed to overlap the first long axis 330 of the exit surface 300a. In this case, the second short axis length Dx2 of the second short axis 212 is greater than the third short axis length Dx3 of the third short axis 630. Further, a center C5 of the third protrusion 600, at which the third long axis 620 and the third short axis 630 meet, may be disposed in the long axis direction of the exit surface 300a.

Referring to FIG. 28, an edge at which the third protrusion 600 and the incidence surface 200a meet may be formed in an elliptical shape. Here, the edge at which the third protrusion 600 and the incidence surface 200a meet may be called a third edge. In this case, a cross-sectional area of the third protrusion 600 may decrease toward the optical axis C. Thus, since the third protrusion 600 includes a maximum cross-sectional area at the edge, the third long axis length Dy3 of the third long axis 620 and the third short axis length Dx3 of the third short axis 630 become maximum at the edge.

The edge may include one point P5 at a lower end and one point P6 at an upper end based on the optical axis direction. Here, the one point P5 at the lower end may be called a fifth point, and the one point P6 at the upper end may be called a sixth point.

Referring to FIGS. 33 and 35, in embodiments, the third protrusion 600 is disposed within a predetermined available range based on the long axis direction of the exit surface 300a. Here, the available range may indicate a range between a distance R7 from the optical axis C to the one point P5 at the lower end of the edge in the radial direction and a distance R8 from the optical axis C to the one point P6 at the upper end of the edge in the radial direction. In one embodiment, the available range may be a factor which indicates how far the third protrusion 600 is away from the optical axis C in the long axis direction of the exit surface 300a.

Therefore, when the third protrusion 600 is disposed outside the available range, a dark portion and a bright portion are generated in an image due to internal reflection of the light diffusion lens 1c such that light uniformity may be degraded.

Consequently, the light diffusion lens 1c may secure light uniformity by locating the third protrusion 600 within the available range.

As shown in FIG. 35, the distance R7 from the optical axis C to the one point P5 at the lower end of the edge may be formed to be greater than the distance R8 from the optical axis C to the one point P6 at the upper end of the edge. Further, the distance R7 from the optical axis C to the one point P5 at the lower end of the edge may be formed to be smaller than half of the second short axis length Dx2 of the incidence hole 210a.

Therefore, the light diffusion lens 1c may define the distance R7 from the optical axis C to the one point P5 at the lower end of the edge and the distance R8 from the optical axis C to the one point P6 at the upper end of the edge based on the half of the second short axis length Dx2 of the incidence hole 210a, thereby presenting an arrangement position of the third protrusion 600.

Here, the half of the second short axis length Dx2 of the incidence hole 210a may be 9.9 to 10.0 times a difference R7-R8 between the distance R7 from the optical axis C to the one point P5 at the lower end of the edge and the distance R8 from the optical axis C to the one point P6 at the upper end of the edge. Specifically, the half of the second short axis length Dx2 of the incidence hole 210a may be 9.95 times the difference R7-R8 between the distance R7 from the optical axis C to the one point P5 at the lower end of the edge and the distance R8 from the optical axis C to the one point P6 at the upper end of the edge.

Meanwhile, the one point P6 at the upper end of the edge may be disposed above an imaginary line L passing through a center C2 of the height H1 of the incidence surface 200a in a horizontal direction based on the optical axis direction. In this case, the line L may be disposed above the side surface 320a.

Figure 37:
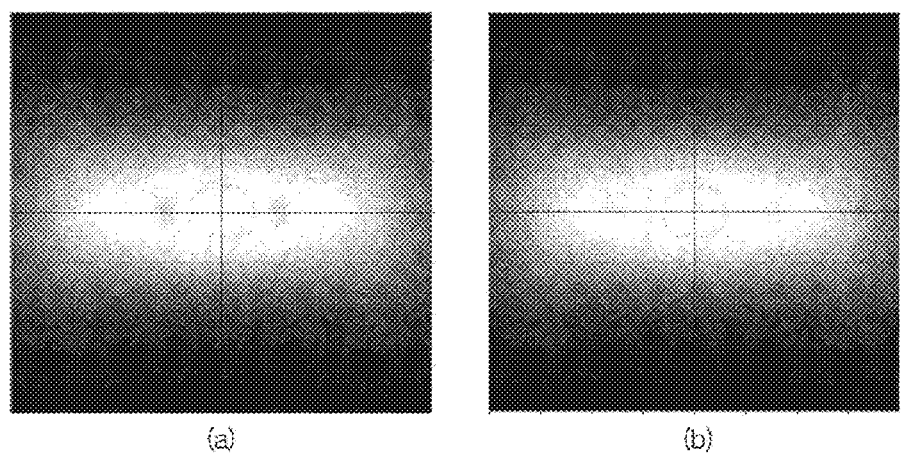
FIG. 37 shows photographs illustrating light distribution before and after application of a third protrusion in the light diffusion lens according to the fourth embodiment.

FIG. 37 shows photographs illustrating before and after application of a third protrusion. Here, FIG. 37A is a diagram illustrating light formed by a light diffusion lens in which a third protrusion is omitted from the light diffusion lens according to the fourth embodiment, and FIG. 37B is a diagram illustrating light formed by the light diffusion lens, to which the third protrusion is applied, according to the fourth embodiment.

Lights incident into the third protrusion 600 may be refracted by the third protrusion 600 to improve light uniformity of the light diffusion lens 1c. For example, the lights incident into the third protrusion 600 may be collected by the third protrusion 600 and refracted to the top surface 310. For example, the third protrusion 600 may serve as a converging lens.

Thus, as shown in FIG. 37A, when the third protrusion is omitted from the light diffusion lens according to the fourth embodiment, a dark portion is formed. However, as shown in FIG. 37B, when the third protrusion 600 is applied to the light diffusion lens 1c according to the fourth embodiment, it can be confirmed that the dark portion is removed or minimized such that light uniformity is improved.

In this case, a five surface emission LED may be used as the light source 10. Accordingly, the third protrusion 600 is disposed in the same radial direction to correspond to a side light-emitting surface 12 such that the light uniformity may be improved.

Fifth Embodiment

Figure 38:
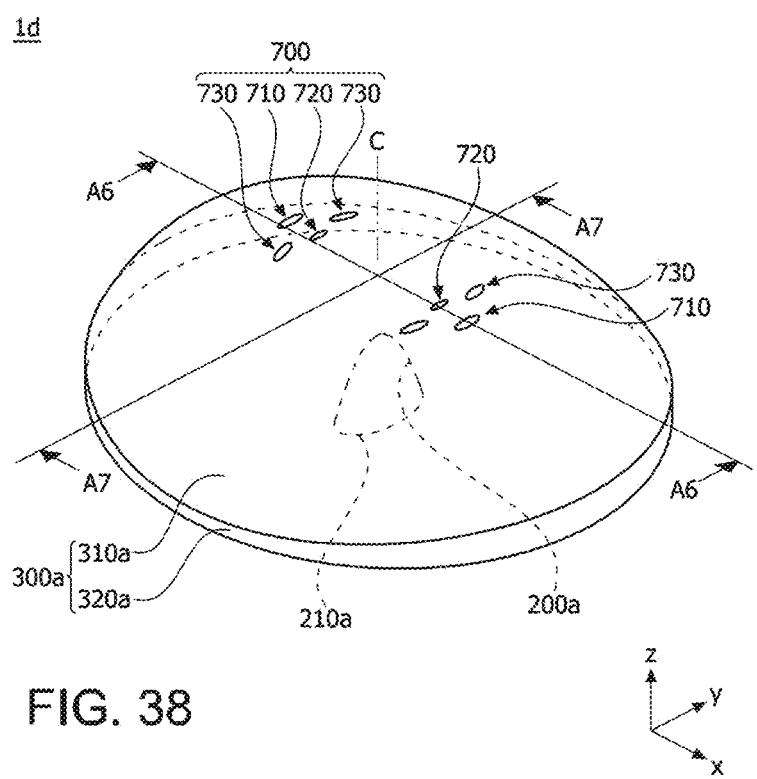
FIG. 38 is a perspective view illustrating a light diffusion lens according to a fifth embodiment.
Figure 39:
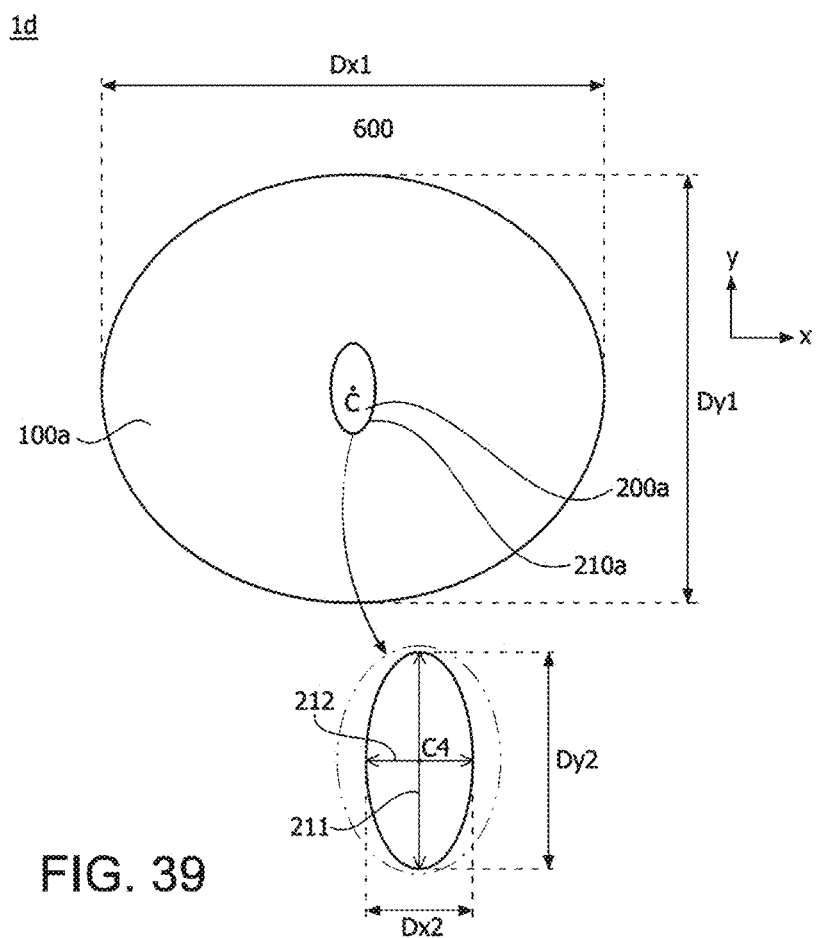
FIG. 39 is a bottom view illustrating the light diffusion lens according to the fifth embodiment.
Figure 40:
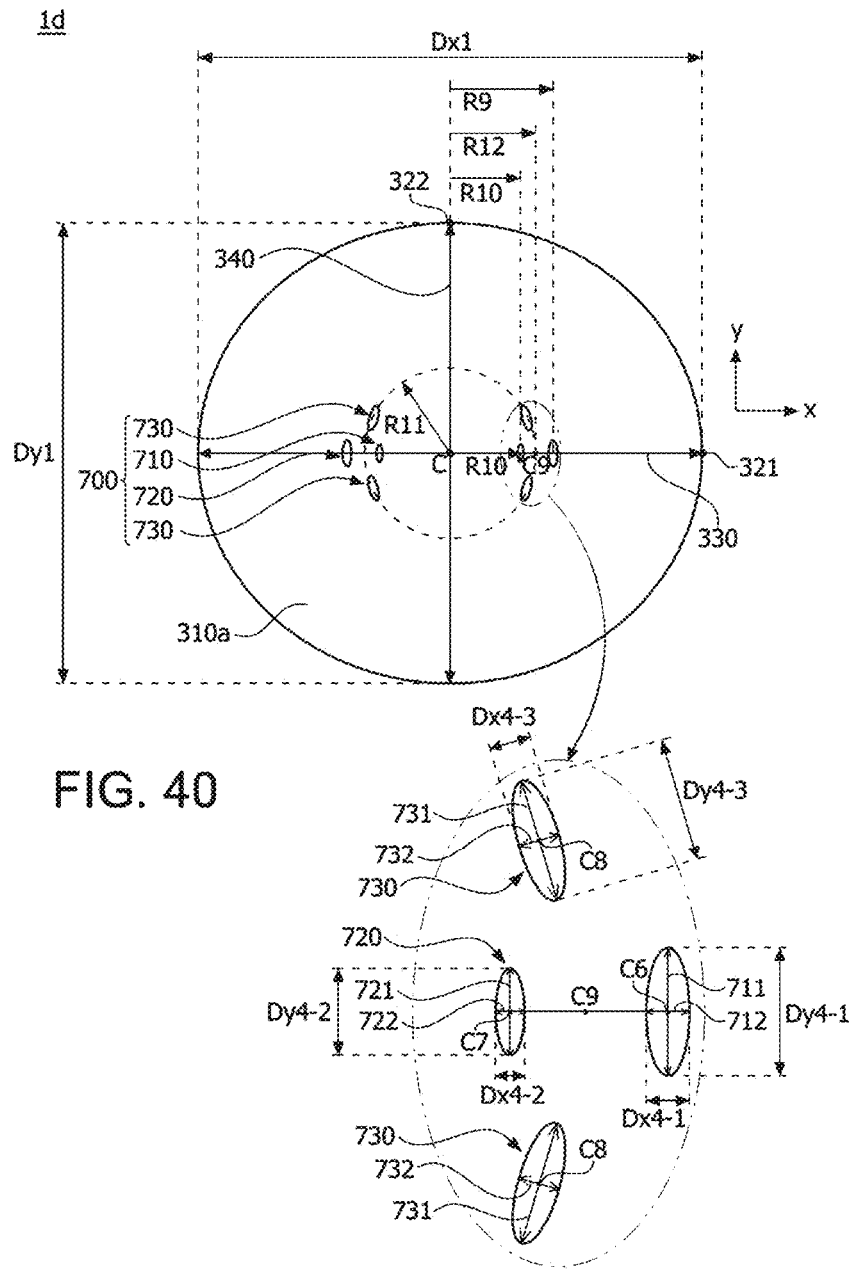
FIG. 40 is a plan view illustrating the light diffusion lens according to the fifth embodiment.
Figure 41:
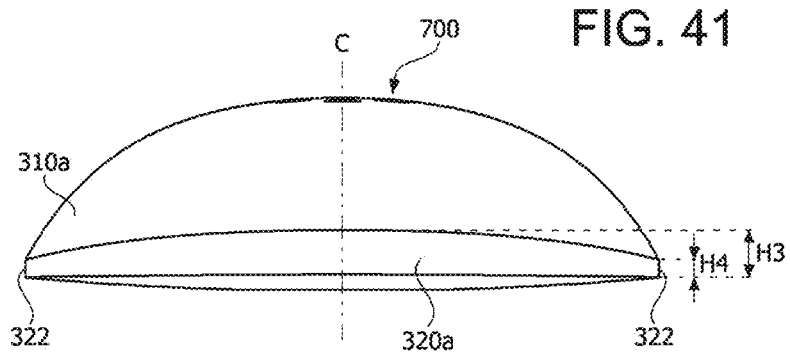
FIG. 41 is a front view illustrating the light diffusion lens according to the fifth embodiment.
Figure 42:
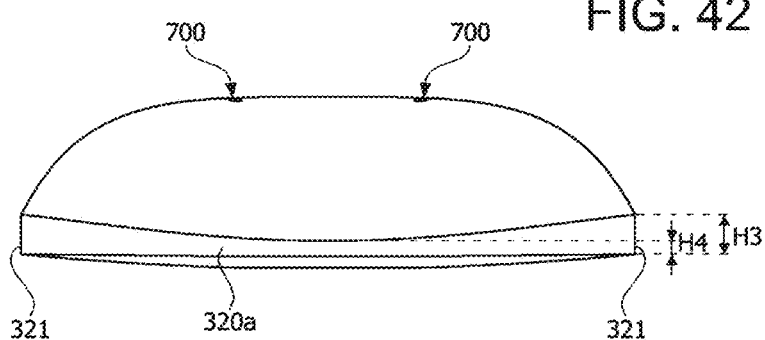
FIG. 42 is a side view illustrating the light diffusion lens according to the fifth embodiment.
Figure 43:
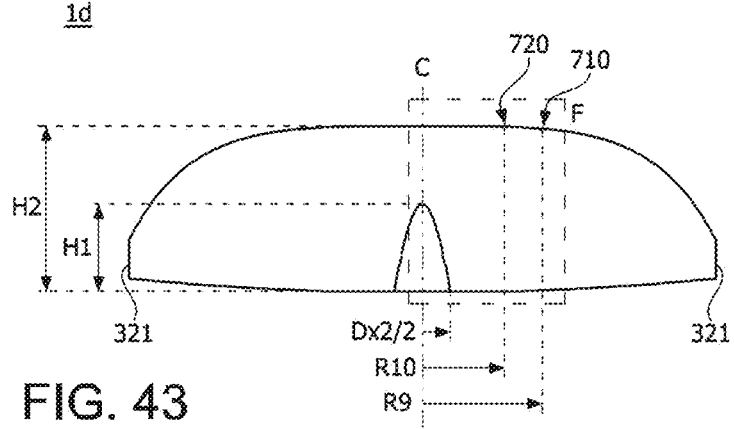
FIG. 43 is a cross-sectional view in a long axis direction based on an exit surface of the light diffusion lens according to the fifth embodiment.

FIG. 38 is a perspective view illustrating a light diffusion lens according to a fifth embodiment, FIG. 39 is a bottom view illustrating the light diffusion lens according to the fifth embodiment, FIG. 40 is a plan view illustrating the light diffusion lens according to the fifth embodiment, FIG. 41 is a front view illustrating the light diffusion lens according to the fifth embodiment, FIG. 42 is a side view illustrating the light diffusion lens according to the fifth embodiment, FIG. 43 is a cross-sectional view in a long axis direction based on an exit surface of the light diffusion lens according to the fifth embodiment, FIG. 44 is a cross-sectional view in a short axis direction based on the exit surface of the light diffusion lens according to the fifth embodiment, FIG. 45 is an enlarged view illustrating area F of FIG. 43, and FIG. 46 is a diagram illustrating an arrangement relationship between a light source and the light diffusion lens according to the fifth embodiment. Here, FIG. 43 is a cross-sectional view taken along line A6-A6 of FIG. 38, and FIG. 44 is a cross-sectional view taken along line A7-A7 of FIG. 38.

In describing a light diffusion lens 1d according to the fifth embodiment, the same components as those of the light diffusion lens 1c according to the fourth embodiment are denoted by the same reference numerals, and thus detailed descriptions thereof will be omitted herein.

Comparing the light diffusion lens 1d according to the fifth embodiment with the light diffusion lens 1c according to the fourth embodiment, the light diffusion lens 1d according to the fifth embodiment is different from the light diffusion lens 1c in that the third protrusions 600 are omitted and a plurality of fourth dimples 700 are included.

Referring to FIGS. 38 to 45, the light diffusion lens 1d according to the fifth embodiment may include a bottom surface 100a, an incidence surface 200a concavely formed inward the bottom surface 100a to form an incidence hole 210a, an exit surface 300a from which light incident through the incidence surface 200a is emitted, and the fourth dimples 700 concavely formed on the exit surface 300a. Here, the exit surface 300a may include a top surface 310a and a side surface 320a.

Therefore, the light diffusion lens 1d may diffuse light emitted from a light source 10 using the aspherical-shaped incidence surface 200a, the exit surface 300a, and the fourth dimples 700 formed on the exit surface 300a.

In embodiments, in the light diffusion lens 1d, since an optical path of the light emitted from the light source 10 is changed due to shapes of the incidence surface 200a and the exit surface 300a and the fourth dimples 700, the shapes of the incidence surface 200a, which is formed in the aspherical shape, and the exit surface 300a, and arrangements, shapes, and sizes of the fourth dimples 700 act as largest factors of light distribution according to the change of the optical path of the light.

A plurality of fourth dimples 700 may be concavely formed on the top surface 310a of the exit surface 300a toward an optical axis C. Accordingly, each of the plurality of fourth dimples 700 may be called a second concave portion or a second groove.

Referring to FIG. 45, each of the plurality of fourth dimples 700 may be formed of a curved surface in a vertical cross section. For example, each of the plurality of fourth dimples 700 may be formed to be concave toward the optical axis C on the exit surface 300a. In this case, a cross section of the fourth dimple 700 may be formed in an elliptical shape including a long axis and a short axis.

Referring to FIG. 40, the plurality of fourth dimples 700 may include a fourth-first dimple 710 formed at a predetermined radius R9 from the optical axis C, a fourth-second dimple 720 formed at a predetermined radius R10 from the optical axis C, and two or more fourth-third dimples 730 disposed at a predetermined radius R11 based on the optical axis C. Here, the fourth-first dimple 710 and the fourth-second dimple 720 may be disposed to be spaced apart from each other in the same radial direction of a first long axis 330 of the exit surface 300a. Further, the radius R11 of the fourth-third dimple 730 is smaller than the radius R9 of the fourth-first dimple 710 and is greater than the radius R10 of the fourth-second dimple 720.

The fourth-first dimple 710 may include a fourth-first long axis 711 with a predetermined fourth-first long axis length Dy4-1 and a fourth-first short axis 712 with a predetermined fourth-first short axis length Dx4-1. Here, the fourth-first long axis length Dy4-1 may be called a long axis length of the fourth-first dimple 710, and the fourth-first short axis length Dx4-1 may be called a short axis length of the fourth-first dimple 710. In this case, the fourth-first long axis length Dy4-1 is greater than the fourth-first short axis length Dx4-1.

Further, a center C6 of the fourth-first dimple 710 may be disposed at an intersection at which the fourth-first long axis 711 and the fourth-first short axis 712 meet. Accordingly, the radius R9 of the fourth-first dimple 710 may be a distance from the optical axis C to the center C6 of the fourth-first dimple 710.

Further, when the exit surface 300a is viewed in the optical axis direction, the fourth-first short axis 712 of the fourth-first dimple 710 may be disposed to overlap the first long axis 330 of the exit surface 300a.

The fourth-second dimple 720 may include a fourth-second long axis 721 with a predetermined fourth-second long axis length Dy4-2 and a fourth-second short axis 722 with a predetermined fourth-second short axis length Dx4-2. Here, the fourth-second long axis length Dy4-2 may be called a long axis length of the fourth-second dimple 720, and the fourth-second short axis length Dx4-2 may be called a short axis length of the fourth-second dimple 720. In this case, the fourth-second long axis length Dy4-2 is greater than the fourth-second short axis length Dx4-2.

Further, a center C7 of the fourth-second dimple 720 may be disposed at an intersection at which the fourth-second long axis 721 and the fourth-second short axis 722 meet. Accordingly, the radius R10 of the fourth-second dimple 720 may be a distance from the optical axis C to the center C7 of the fourth-second dimple 720.

Further, when the exit surface 300a is viewed in the optical axis direction, the fourth-second short axis 722 of the fourth-second dimple 720 may be disposed to overlap the first long axis 330 of the exit surface 300a.

The fourth-third dimple 730 may include a fourth-third long axis 731 with a predetermined fourth-third long axis length Dy4-3 and a fourth-third short axis 732 with a predetermined fourth-third short axis length Dx4-3. Here, the fourth-third long axis length Dy4-3 may be called a long axis length of the fourth-third dimple 730, and the fourth-third short axis length Dx4-3 may be called a short axis length of the fourth-third dimple 730. In this case, the fourth-third long axis length Dy4-3 is greater than the fourth-third short axis length Dx4-3.

Further, a center C8 of the fourth-third dimple 730 may be disposed at an intersection at which the fourth-third long axis 731 and the fourth-third short axis 732 meet. Accordingly, the radius R11 of the fourth-third dimple 730 may be a distance from the optical axis C to the center C8 of the fourth-third dimple 730.

Further, when the exit surface 300a is viewed in the optical axis direction, the fourth-third short axis 732 of the fourth-third dimple 730 is not disposed to overlap the first long axis 330 of the exit surface 300a.

Here, the fourth-third long axis length Dy4-3 of the fourth-third dimple 730 may be smaller than the fourth-first long axis length Dy4-1 of the fourth-first dimple 710 and greater than the fourth-second long axis length Dy4-2 of the fourth-second dimple 720.

Referring to FIG. 40, the radius R9 to the center C6 of the fourth-first dimple 710 and the radius R10 to the center C7 of the fourth-second dimple 720 are greater than the radius R11 to the center C8 of the fourth-third dimple 730 based on the optical axis C.

Referring to FIG. 40, the center C6 of the fourth-first dimple 710 and the centers C8 of the two fourth-third dimples 730 may be formed in a triangular shape including an imaginary first area. Further, the center C7 of the fourth-second dimple 720 and the centers C8 of the two fourth-third dimples 730 may be formed in a triangular shape including an imaginary second area. In this case, the imaginary first area is greater than the imaginary second area.

Meanwhile, the fourth-first dimple 710, the fourth-second dimple 720, and the two fourth-third dimples 730 may form one group. Further, as shown in FIG. 40, the light diffusion lens 1d may include two groups facing each other based on the optical axis C, and the two groups may be symmetrically disposed based on the optical axis C.

Accordingly, in the light diffusion lens 1d, the plurality of fourth dimples 700 may be formed in at least two groups which are symmetrical based on the optical axis C. Accordingly, the light diffusion lens 1d may improve light uniformity in the long axis direction of the exit surface 300a. Here, in consideration of the light emitted from the light source 10, two or more or three or more groups of the plurality of fourth dimples 700 may be disposed. Additionally, in consideration of optical uniformity, two or more even numbers of groups of the plurality of fourth dimples 700 may be disposed to face each other based on the optical axis C.

Referring to FIG. 46, since some of the lights emitted from the light source 10 may be emitted at a predetermined divergence angle θ based on the optical axis C, the plurality of fourth dimples 700 are disposed within the divergence angle θ so that the light is refracted to be emitted. Accordingly, the light diffusion lens 1d may secure light diffusivity and light uniformity by changing the optical path of some of the lights, which have directivity in a specific direction, through the fourth dimple 700. In this case, the divergence angle θ may be 50 degrees or less based on the optical axis C. Specifically, since the fourth-first dimple 710 of the fourth dimple 700 is disposed at an outermost side based on the optical axis C, the center C6 of the fourth-first dimple 710 may be disposed at an angle ranging from 34 degrees to 40 degrees based on the optical axis C. Preferably, the center C6 of the fourth-first dimple 710 of the fourth dimple 700 may be disposed at an angle of 37 degrees based on the optical axis C.

Referring to FIGS. 38 and 40, edges at which the plurality of fourth dimples 700 and the exit surface 300a meet may be formed in an elliptical shape. Here, the edge at which the fourth dimple 700 and the exit surface 300a meet may be called a third edge.

Referring to FIGS. 43 and 45, the edge at which the fourth dimple 700 and the exit surface 300a meet may include one point at a lower end and one point at an upper end based on the optical axis direction. Here, the one point at the lower end of the fourth dimple 700 may be the center C6 of the fourth-first dimple 710, and the one point at the upper end of the fourth dimple 700 may be the center C7 of the fourth-second dimple 720.

Referring to FIG. 45, in embodiments, the fourth dimple 700 is disposed within a predetermined available range based on the long axis direction of the exit surface 300a. Here, the available range may indicate a range between a radius R9 from the optical axis C to the center C6 of the fourth-first dimple 710 in the long axis direction and a radius R10 from the optical axis C to the center C7 of the fourth-second dimple 720 in the long axis direction.

Therefore, when the fourth dimple 700 is disposed outside the available range, a dark portion and a bright portion are generated in an image due to external refraction of the light diffusion lens 1d such that light uniformity may be degraded.

Consequently, the light diffusion lens 1d may secure the light uniformity by locating the fourth dimple 700 within the available range.

As shown in FIG. 45, the radius R9 from the optical axis C to may be formed to be greater than the radius R10 therefrom. Further, the radius R10 may be formed to be greater than half of a second short axis length Dx2 of the incidence hole 210a.

Figure 47:
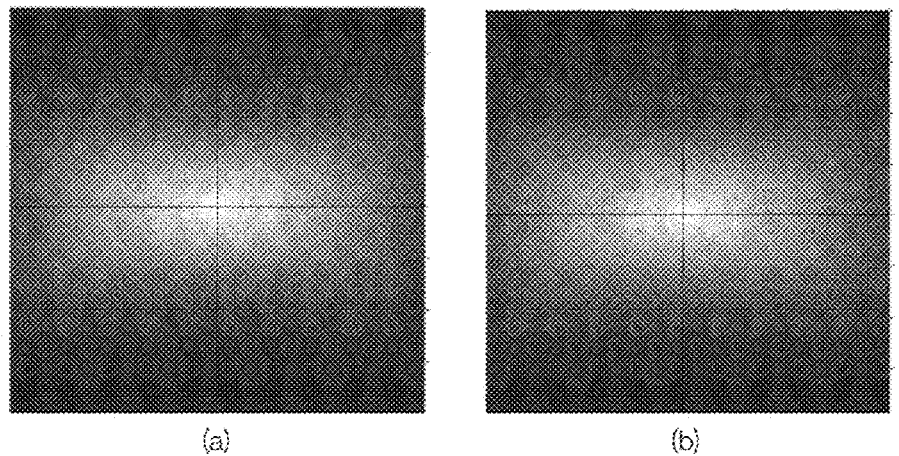
FIG. 47 shows photographs illustrating light distribution before and after application of a third protrusion in the light diffusion lens according to the fifth embodiment.

FIG. 47 shows photographs illustrating before and after application of a fourth dimple. Here, FIG. 47A is a diagram illustrating light formed by a light diffusion lens in which a fourth dimple is omitted from the light diffusion lens according to the fifth embodiment, and FIG. 47B is a diagram illustrating light formed by the light diffusion lens, to which the fourth dimple is applied, according to the fifth embodiment.

Lights incident into the fourth dimple 700 may be refracted by the fourth dimple 700 to improve light uniformity of the light diffusion lens 1d. For example, the lights incident into the fourth dimple 700 may diverge by the fourth dimple 700 to be diffused to the outside. For example, the fourth dimple 700 may serve as a diverging lens.

Thus, as shown in FIG. 47A, when the fourth dimple is omitted from the light diffusion lens according to the fifth embodiment, a bright portion is formed. However, as shown in FIG. 47B, when the fourth dimple 700 is applied to the light diffusion lens 1d according to the fifth embodiment, it can be confirmed that the bright portion is improved such that light uniformity is improved.

In this case, a five surface emission LED may be used as the light source 10. Accordingly, the fourth dimple 700 is disposed in the same radial direction to correspond to a side light-emitting surface 12 such that the light uniformity of the light diffusion lens 1d may be improved.

Sixth Embodiment

Figure 48:
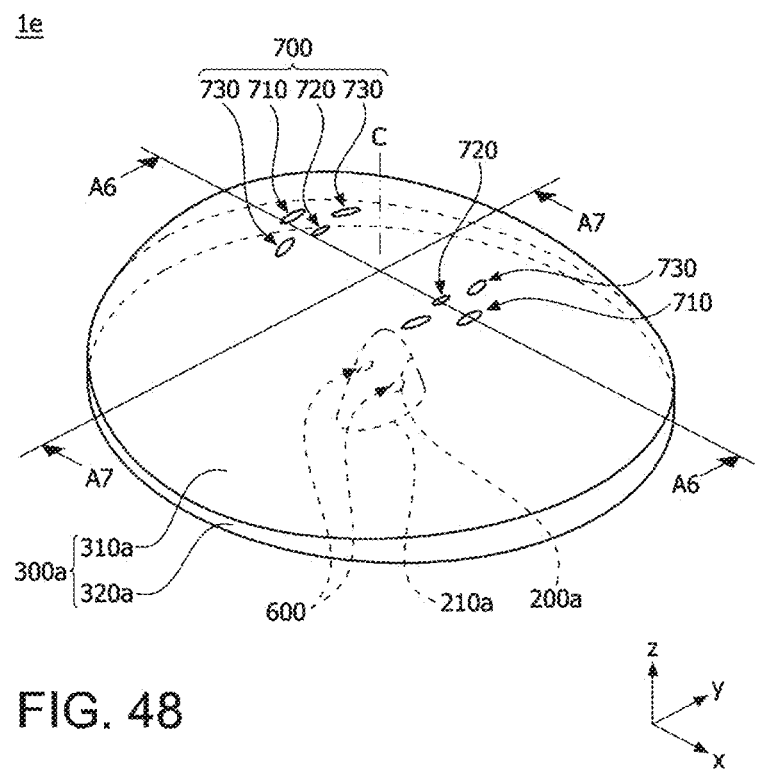
FIG. 48 is a perspective view illustrating a light diffusion lens according to a sixth embodiment.
Figure 49:
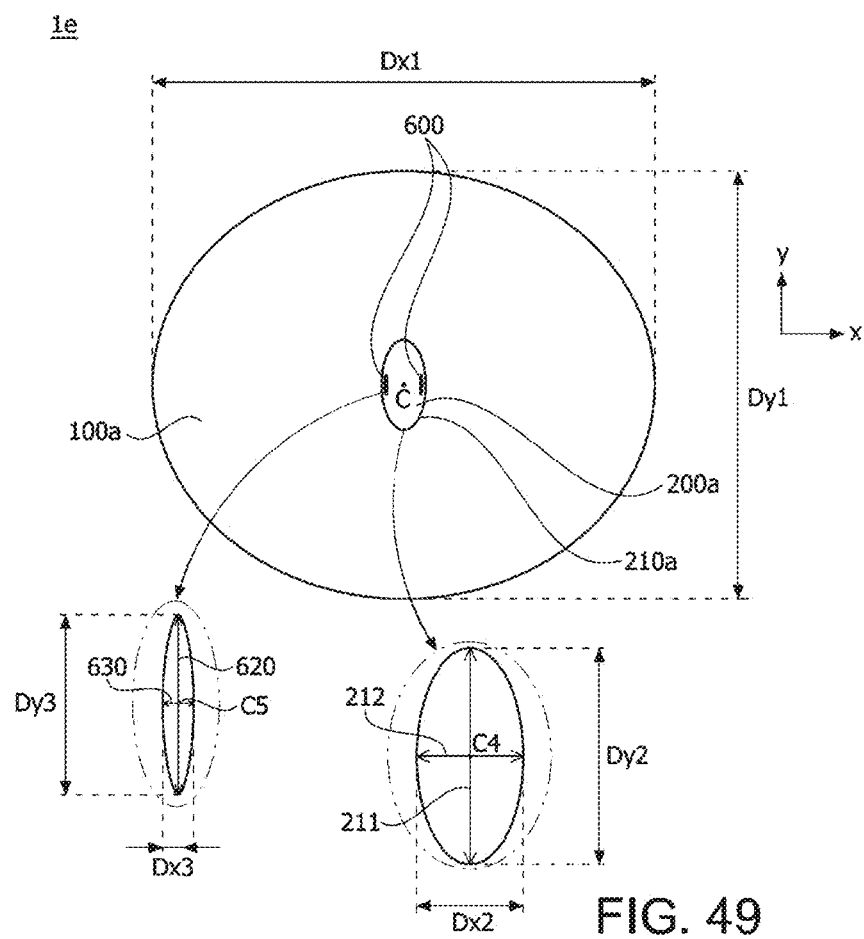
FIG. 49 is a bottom view illustrating the light diffusion lens according to the sixth embodiment.
Figure 50:
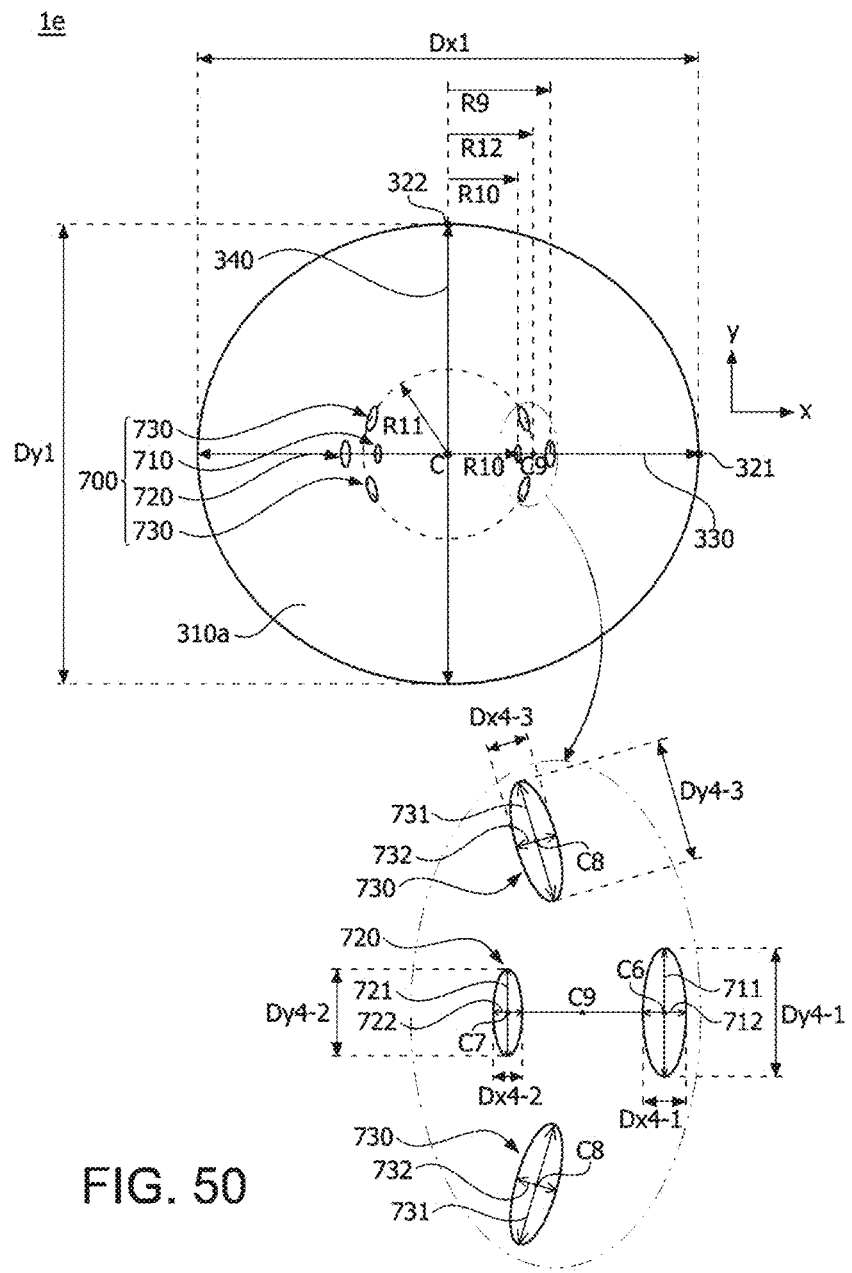
FIG. 50 is a plan view illustrating the light diffusion lens according to the sixth embodiment.
Figure 51:
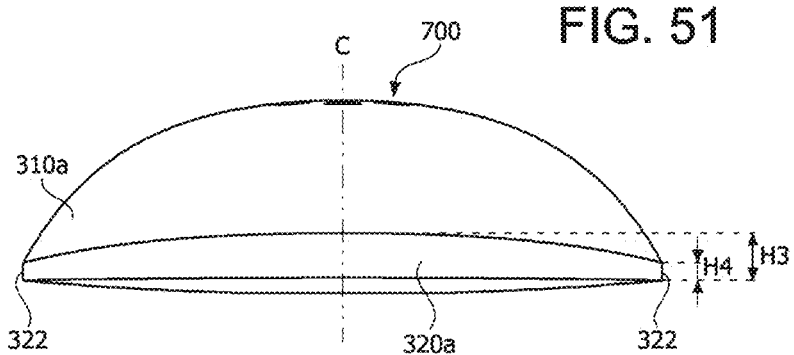
FIG. 51 is a front view illustrating the light diffusion lens according to the sixth embodiment.
Figure 52:
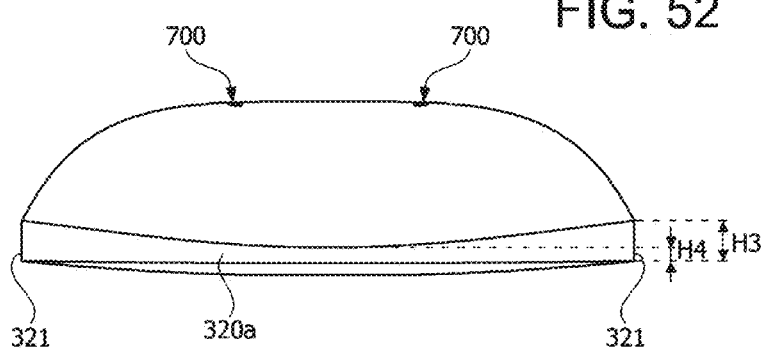
FIG. 52 is a side view illustrating the light diffusion lens according to the sixth embodiment.
Figure 53:
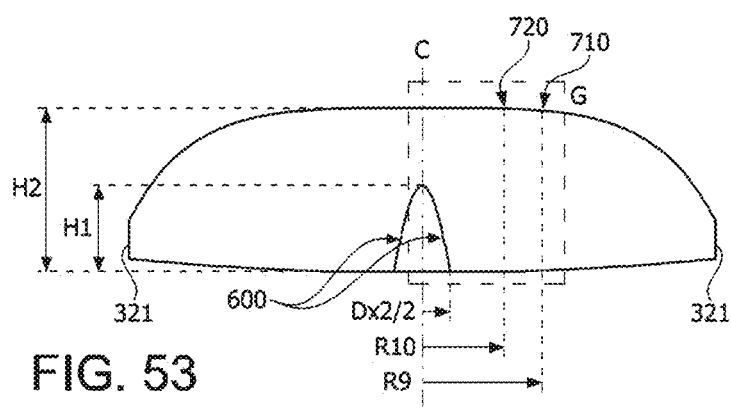
FIG. 53 is a cross-sectional view in a long axis direction based on an exit surface of the light diffusion lens according to the sixth embodiment.
Figure 54:
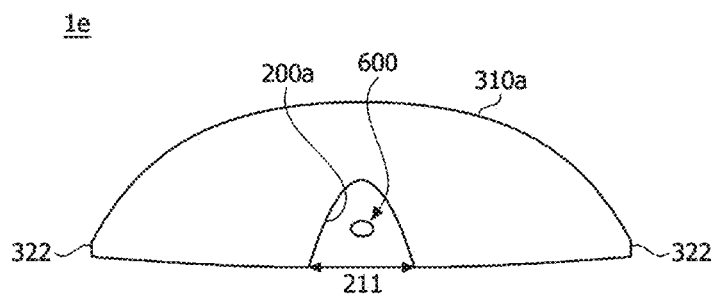
FIG. 54 is a cross-sectional view in a short axis direction based on the exit surface of the light diffusion lens according to the sixth embodiment.
Figure 55:
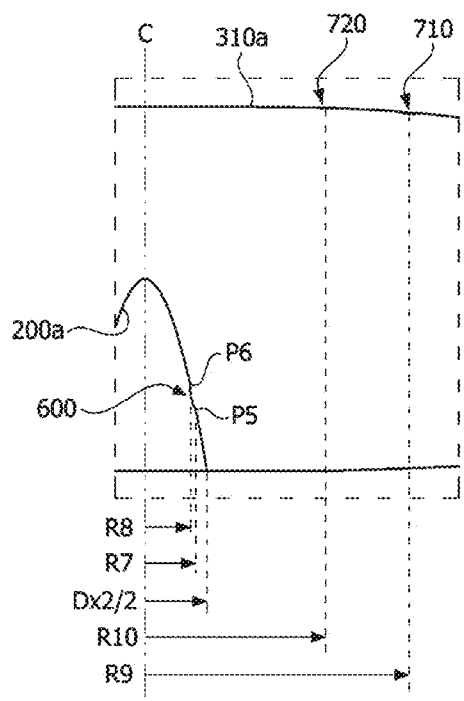
FIG. 55 is an enlarged view illustrating area G of FIG. 53.
Figure 56:
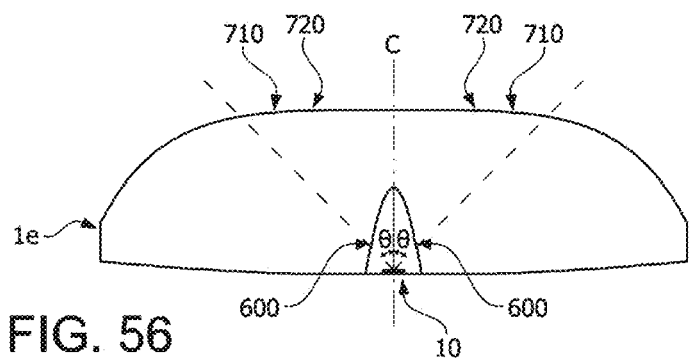
FIG. 56 is a diagram illustrating an arrangement relationship between a light source and the light diffusion lens according to the sixth embodiment.

FIG. 48 is a perspective view illustrating a light diffusion lens according to a sixth embodiment, FIG. 49 is a bottom view illustrating the light diffusion lens according to the sixth embodiment, FIG. 50 is a plan view illustrating the light diffusion lens according to the sixth embodiment, FIG. 51 is a front view illustrating the light diffusion lens according to the sixth embodiment, FIG. 52 is a side view illustrating the light diffusion lens according to the sixth embodiment, FIG. 53 is a cross-sectional view in a long axis direction based on an exit surface of the light diffusion lens according to the sixth embodiment, FIG. 54 is a cross-sectional view in a short axis direction based on the exit surface of the light diffusion lens according to the sixth embodiment, FIG. 55 is an enlarged view illustrating area G of FIG. 53, and FIG. 56 is a diagram illustrating an arrangement relationship between a light source and the light diffusion lens according to the sixth embodiment. Here, FIG. 53 is a cross-sectional view taken along line A8-A8 of FIG. 48, and FIG. 54 is a cross-sectional view taken along line A9-A9 of FIG. 48.

In describing a light diffusion lens 1e according to the sixth embodiment, the same components as those of the light diffusion lens 1c according to the fourth embodiment and the light diffusion lens 1d according to the fifth embodiment are denoted by the same reference numerals, and thus detailed descriptions thereof will be omitted herein.

Comparing the light diffusion lens 1e according to the sixth embodiment with the light diffusion lens 1c according to the fourth embodiment, the light diffusion lens 1e according to the sixth embodiment is different from the light diffusion lens 1c in that a plurality of fourth dimples 700 are further included.

Referring to FIGS. 48 to 55, the light diffusion lens 1e according to the sixth embodiment may include a bottom surface 100a, an incidence surface 200a concavely formed inward the bottom surface 100a to form an incidence hole 210a, an exit surface 300a from which light incident through the incidence surface 200a is emitted, third protrusions 600 convexly formed on the incidence surface 200a, and the fourth dimples 700 concavely formed on the exit surface 300a. Here, the exit surface 300a may include a top surface 310a and a side surface 320a.

Therefore, the light diffusion lens 1e may diffuse light emitted from a light source 10 using the aspherical-shaped incidence surface 200a, the exit surface 300a, the third protrusions 600 formed on the incidence surface 200a, and the fourth dimples 700 formed on the exit surface 300a.

In embodiments, in the light diffusion lens 1e, since an optical path of the light emitted from the light source 10 is changed due to shapes of the incidence surface 200a and the exit surface 300a, the third protrusions 600, and the fourth dimples 700, the shapes of the incidence surface 200a, which is formed in the aspherical shape, and the exit surface 300a, and arrangements, shapes, and sizes of the fourth dimples 700 act as largest factors of light distribution according to the change of the optical path of the light. In this case, the fourth dimple 700 may be formed to correspond to light which is refracted due to the third protrusion 600.

The third protrusion 600 may be convexly formed on the incidence surface 200a toward the optical axis C, and the fourth dimple 700 may be concavely formed on the top surface 310a of the exit surface 300a toward the optical axis C.

Referring to FIG. 56, since some of the lights emitted from the light source 10 may be emitted at a predetermined divergence angle θ based on the optical axis C, the third protrusion 600 and the fourth dimple 700 are disposed within the divergence angle θ so that the light is refracted to be emitted. Accordingly, the light diffusion lens 1e may secure light diffusivity and light uniformity by changing the optical path of some of the lights, which have directivity in a specific direction, through the third protrusion 600 and the fourth dimple 700. In this case, the divergence angle θ may be 50 degrees or less based on the optical axis C.

In this case, a divergence angle applied to arrange the fourth dimple 700 based on the optical axis C may be smaller than a divergence angle for application of the third protrusion 600. In one embodiments, as shown in FIG. 56, the fourth dimple 700 may be disposed close to the optical axis C based on the divergence angle for application of the third protrusion 600.

Referring to FIG. 53, the third protrusions 600 and the fourth dimples 700 may be respectively symmetrically disposed based on the optical axis C in a vertical cross section. Accordingly, the light diffusion lens 1e may improve light uniformity in a long axis direction of the exit surface 300a. Here, in consideration of the light emitted from the light source 10, two or more or three or more third protrusions 600 and two or more or three or more fourth dimples 700 may be disposed, respectively. Additionally, in consideration of light uniformity in the long axis direction of the exit surface 300a, groups of two third protrusions 600 and two fourth dimples 700 may be respectively disposed to face each other based on the optical axis C.

Here, the exit surface 300a may be formed to have a first long axis 330 with a predetermined first long axis length Dx1 and a first short axis 340 with a predetermined first short axis length Dy1. The third protrusion 600 may be disposed in the same direction as the first long axis 330. Accordingly, a third short axis 630 of the third protrusion 600 may be disposed to overlap the first long axis 330 of the exit surface 300a.

Further, a plurality of fourth dimples 700 may include a fourth-first dimple 710, a fourth-second dimple 720, and two fourth-third dimples 730. A fourth-first short axis 712 of the fourth-first dimple 710 and a fourth-second short axis 722 of the fourth-second dimple 720 may be disposed to overlap the first long axis 330 of the exit surface 300a.

Thus, when the exit surface 300a is viewed in the optical axis direction, the third short axis 630, the fourth-first short axis 712 of the fourth-first dimple 710, and the fourth-second short axis 722 of the fourth-second dimple 720 may be disposed to overlap the first long axis 330 of the exit surface 300a.

Meanwhile, a third long axis length Dy3 of a third long axis 620 of the third protrusion 600 may be greater than a fourth-first long axis length Dy4-1 of a fourth-first long axis 711 of the fourth-first dimple 710.

Further, lights incident into the third protrusion 600 may be collected by the third protrusion 600 and incident into the fourth dimple 700. Further, the lights incident into the fourth dimple 700 may be diffused by the fourth dimple 700 and emitted to the outside.

Consequently, the light diffusion lens 1e may further improve light uniformity by applying the fourth dimple 700 to an area of a minute dark portion or a minute bright portion which is not resolved through the application of the third protrusion 600.

Meanwhile, a five surface emission LED may be used as the light source 10. Accordingly, a plurality of the third protrusions 600 and the plurality of the fourth dimples 700 are disposed in the same direction to correspond to a side light-emitting surface 12 such that the light uniformity of the light diffusion lens 1e may be improved.

As described above, in accordance with the present disclosure, there is an effect in that light diffusivity and light uniformity can be secured by changing an optical path of a part of light having directivity in a specific direction using dimples formed on an incidence surface or an exit surface.

Further, in accordance with the present disclosure, there is an effect in that light uniformity can be improved by removing or minimizing a dark portion due to light distribution using a dimple formed on the incidence surface and can be improved by removing or minimizing the dark portion or a bright portion using a dimple formed on the exit surface.

As discussed in the foregoing, although all the elements forming the embodiments of the present disclosure are combined into one or operated as one element, the present disclosure is not limited thereto. That is, all the elements may be selectively combined or operated if within an object scope of the present disclosure. Furthermore, it will be understood that the terms "includes" and/or "including", "forming" and/or "formed" when used in this specification, specify the presence of stated features, regions, integers, steps, operations, elements, and/or components, but do not preclude the presence or addition of one or more other features, regions, integers, steps, operations, elements, components, and/or groups thereof.

What is claimed is:

1. A light diffusion lens comprising:
a bottom surface having an elliptical shape;
an incidence surface concavely formed inward the bottom surface from one area (an incidence hole) thereof; and
an exit surface from which light incident through the incidence surface is emitted,
wherein a first dimple of an elliptical shape is formed on the exit surface at a position of a predetermined first radius from an optical axis,
at least two second dimples having an elliptical shape are formed on the exit surface at a position of a second radius that is smaller than the first radius, and
a third dimple having an elliptical shape is formed on the exit surface at a position of a third radius that is smaller than the second radius.

2. The light diffusion lens of claim 1, wherein a long axis of the bottom surface is disposed to correspond to short axes of the first and third dimples.

3. The light diffusion lens of claim 1, wherein length of long axis of each of the at least two second dimples is smaller than that of long axis of the first dimple and is greater than that of long axis of the third dimple.

* * * * *